US009133640B2

(12) United States Patent
Cantoni et al.

(10) Patent No.: US 9,133,640 B2
(45) Date of Patent: Sep. 15, 2015

(54) PROCESS FOR BUILDING A TANK AND DEVICES FOR EXECUTING THE PROCESS

(71) Applicant: Cantoni Guas Y Montajes S.R.L., Santa Fe (AR)

(72) Inventors: Marcelo Ricardo Cantoni, Santa Fe (AR); Sebastián Cantoni, Santa Fe (AR)

(73) Assignee: CANTONI GRUAS Y MONTAJES S.R.L., Santa Fe (AR)

( * ) Notice: Subject to any disclaimer, the term of this patent is extended or adjusted under 35 U.S.C. 154(b) by 0 days.

(21) Appl. No.: 14/236,731

(22) PCT Filed: Apr. 3, 2013

(86) PCT No.: PCT/ES2013/070219
§ 371 (c)(1),
(2) Date: Feb. 3, 2014

(87) PCT Pub. No.: WO2013/150168
PCT Pub. Date: Oct. 10, 2013

(65) Prior Publication Data
US 2015/0033640 A1 Feb. 5, 2015

(30) Foreign Application Priority Data

Apr. 4, 2012 (AR) .............................. P20120101191

(51) Int. Cl.
*B23K 31/02* (2006.01)
*E04H 7/00* (2006.01)
(Continued)

(52) U.S. Cl.
CPC .............. *E04H 7/00* (2013.01); *B23K 37/0229* (2013.01); *B23K 37/04* (2013.01); *E02D 27/38* (2013.01); *E02D 31/00* (2013.01); *E02D 35/005* (2013.01);
(Continued)

(58) Field of Classification Search
CPC ........ E04H 7/04; E04H 7/30; B23K 37/0229; B23K 37/04
See application file for complete search history.

(56) References Cited

U.S. PATENT DOCUMENTS 1,966,244 A * 7/1934 Hansen .......................... 220/565
2,751,672 A * 6/1956 Reed ............................... 29/429
(Continued)

FOREIGN PATENT DOCUMENTS

EP 1 464 418 A1 10/2004
ES 455737 1/1978
(Continued)

OTHER PUBLICATIONS

International Search Report for PCT/ES2013/070219 mailed Sep. 2, 2013.

*Primary Examiner* — Devang R Patel
*Assistant Examiner* — Carlos Gamino
(74) *Attorney, Agent, or Firm* — RatnerPrestia

(57) ABSTRACT

The invention relates to a method for building cylindrical structures, preferably made of metal, on the basis of the construction methods referred to as "a method which begins the assembly by the top structure", which provides high levels of safety in the various steps to be carried out. The method uses a shaping device for shell sheets, at least one stationary cabin for vertically aligning and welding sheets, movable cabins for horizontally welding the inside and outside, and supporting base devices which in combination provide a safe and comfortable working environment for the operators, as well as greater speed and finish quality for the tank to be built, even under harsh weather conditions.

12 Claims, 18 Drawing Sheets

(51) Int. Cl.

| | |
|---|---|
| *E04H 7/06* | (2006.01) |
| *E04H 7/30* | (2006.01) |
| *B23K 37/02* | (2006.01) |
| *B23K 37/04* | (2006.01) |
| *E02D 27/38* | (2006.01) |
| *E02D 31/00* | (2006.01) |
| *E02D 35/00* | (2006.01) |
| *E04H 7/04* | (2006.01) |
| *F16M 11/00* | (2006.01) |
| *F16M 13/00* | (2006.01) |

(52) U.S. Cl.
CPC .. *E04H 7/04* (2013.01); *E04H 7/06* (2013.01); *E04H 7/30* (2013.01); *F16M 11/00* (2013.01); *F16M 13/00* (2013.01)

(56) References Cited

U.S. PATENT DOCUMENTS

| | | | | |
|---|---|---|---|---|
| 2,984,898 | A * | 5/1961 | Svensson | 29/429 |
| 3,092,216 | A * | 6/1963 | Tye, Jr. | 52/247 |
| 3,131,908 | A * | 5/1964 | Payton | 254/89 H |
| 3,182,958 | A * | 5/1965 | Peterzon-Arbella | 254/89 H |
| 3,239,927 | A * | 3/1966 | Hozak | 29/429 |
| 3,380,147 | A * | 4/1968 | McDonald | 228/145 |
| 3,471,053 | A * | 10/1969 | Endicott et al. | 220/565 |
| 3,546,831 | A * | 12/1970 | Kratky et al. | 52/115 |
| 3,637,047 | A * | 1/1972 | Cox | 182/222 |
| 3,817,440 | A * | 6/1974 | Bartley | 228/29 |
| 4,067,097 | A * | 1/1978 | Okamoto | 29/429 |
| 4,074,847 | A * | 2/1978 | McFatter | 228/145 |
| 4,078,295 | A * | 3/1978 | Koller | 29/429 |
| 4,110,577 | A * | 8/1978 | Spisak | 219/101 |
| 4,121,747 | A * | 10/1978 | McFatter | 228/17.7 |
| 4,142,284 | A * | 3/1979 | Steuber | 29/417 |
| 4,177,915 | A * | 12/1979 | Blankenburg | 228/184 |
| 4,197,689 | A * | 4/1980 | DeMuth | 52/745.01 |
| 4,494,291 | A * | 1/1985 | Morrison | 29/281.4 |
| 4,651,401 | A * | 3/1987 | Arbella | 29/429 |
| 6,266,862 | B1 * | 7/2001 | Oostwouder et al. | 29/281.4 |
| 6,282,863 | B1 * | 9/2001 | Christian et al. | 52/747.1 |
| 6,732,906 | B2 * | 5/2004 | Andersen | 228/145 |
| 7,500,592 | B1 * | 3/2009 | Petricio Yaksic | 228/184 |
| 7,743,582 | B1 * | 6/2010 | Petricio Yaksic | 52/745.06 |
| 7,866,196 | B2 * | 1/2011 | Vanderbeken | 72/50 |
| 8,127,418 | B2 * | 3/2012 | Bertelsen et al. | 29/281.4 |
| 8,701,832 | B2 * | 4/2014 | Honein et al. | 182/223 |
| 2001/0018839 | A1 * | 9/2001 | Miller et al. | 72/49 |
| 2004/0124226 | A1 * | 7/2004 | Morrison | 228/102 |
| 2012/0273556 | A1 * | 11/2012 | Unan | 228/154 |

FOREIGN PATENT DOCUMENTS

| | | |
|---|---|---|
| ES | 2 134 107 | 9/1999 |
| GB | 781793 | 8/1957 |
| JP | S 58-3790 | 1/1983 |
| WO | WO 2012/004440 A1 | 1/2012 |

* cited by examiner

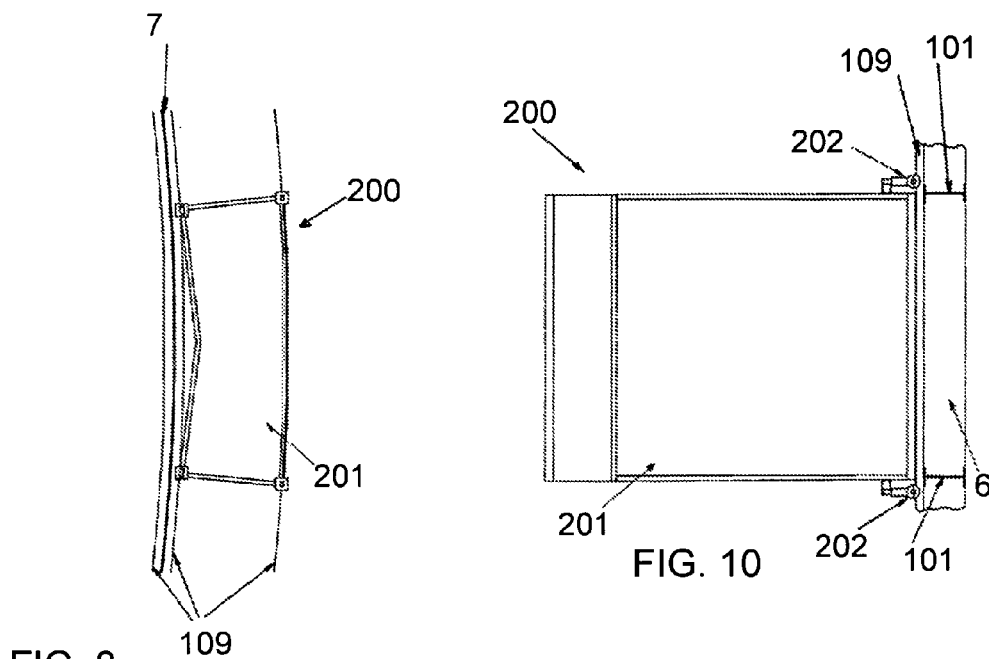
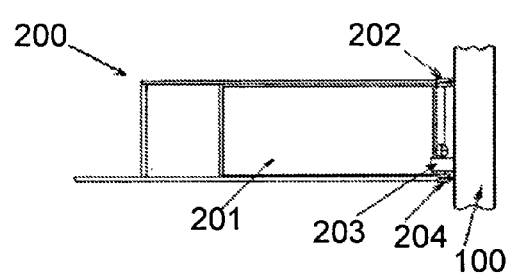
FIG. 8
FIG. 10
FIG. 9

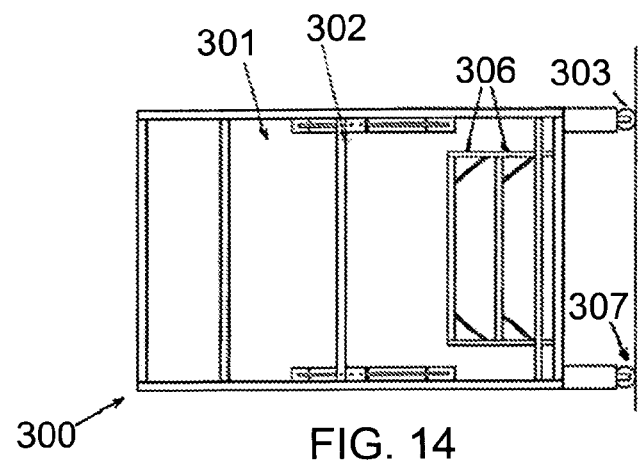
FIG. 14
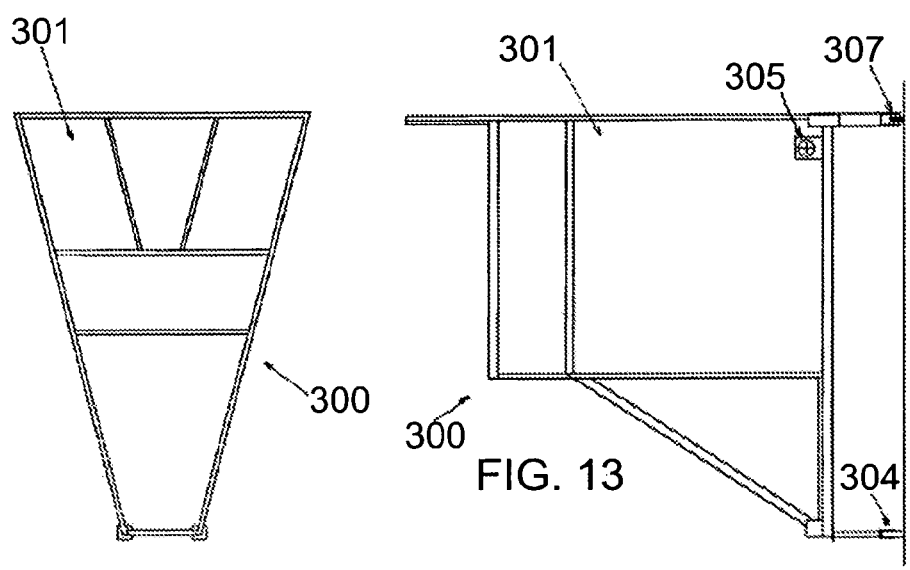
FIG. 11
FIG. 13
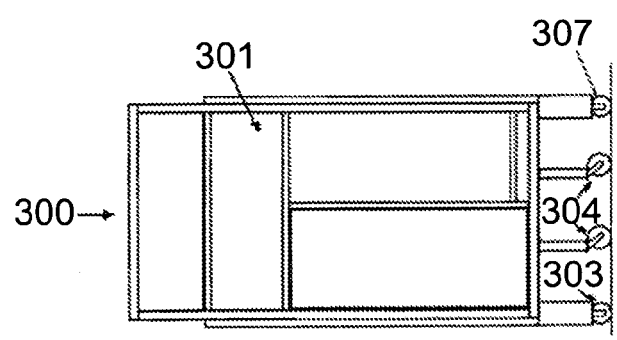
FIG. 12

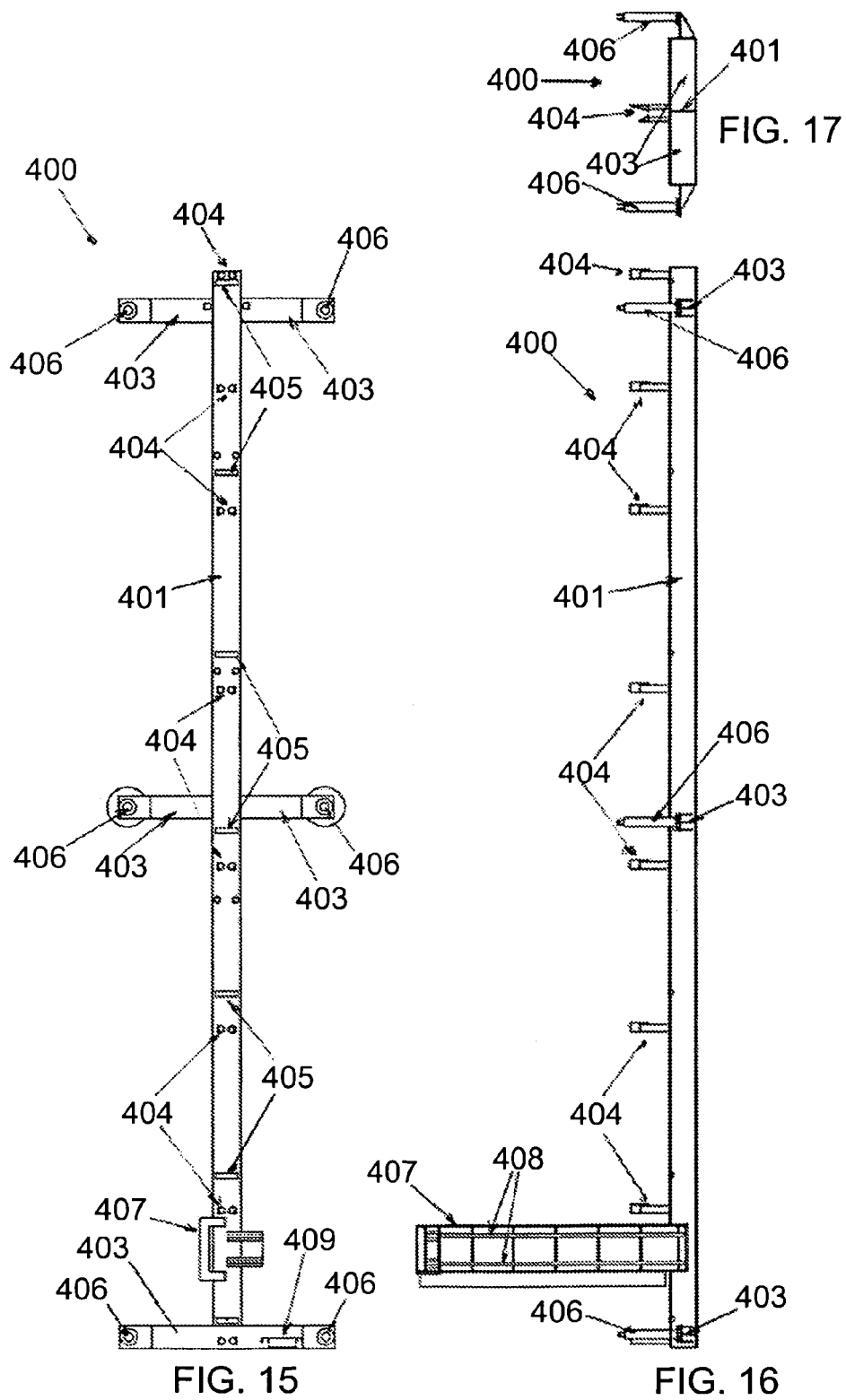

PROCESS FOR BUILDING A TANK AND DEVICES FOR EXECUTING THE PROCESS

CROSS REFERENCE TO RELATED APPLICATIONS

This application is the U.S. National Phase Application of PCT/ES2013/070219, filed Apr. 3, 2013, which claims priority to Argentina Patent Application No. P2012 0101 191, filed Apr. 4, 2012, the contents of such applications being incorporated by reference herein.

FIELD OF APPLICATION

The present invention refers to a construction process of large size cylindrical structures, of the type known as "from the top and down", which uses a sheet forming device for rings, preferably of the metal type, which allows to obtain a continuous metal sheet of any length by means of a concatenation of sheets of a shorter length, supporting base devices which facilitate the rings disposition and molding, and internal and external movable horizontal welding cabinets which allow more efficient welding operations.

STATE OF THE ART AND ITS RELATED ADVANTAGES

Starting from the industrial revolution, mass production of increasing amounts of goods of varied nature made it necessary to build storage structures of a proportionally growing capacity, not only to keep finished products but also to store raw materials, resulting in their usually reaching capacities over 500,000 liters, of dimensions exceeding 75 meters in diameter and 25 meters in height in cylindrical tanks, for instance. Industries such as the petrochemical, biodiesel, oil and the dairy industry, as well as wastewater treatment plants, water purification plants and, in general, every industry requiring the storage of large quantities of fuel, liquids, grains and other products, need large size tanks and containers in order to achieve competitive prices in the purchase of raw materials as well as in large-scale production.

The construction of large size tanks and containers presents a number of technological challenges which are hard to address.

Firstly, the location of the construction site, generally distant from the plant where tank or container parts are constructed, makes it necessary to carry large quantities of voluminous pre-bent parts, as it is described for example in U.S. Pat. No. 7,500,592 B1. One way of dealing with this difficulty is by bending the parts in the construction place, for which patents like the Spanish Patent ES 455.737 use complicated systems of rolls which are temporarily installed in the construction place.

Secondly, the traditional construction system, starting from the base of the tank and assembling the walls with welded ring strips, starting from the lowest ring welded to the base and ending with the construction of the roof and the subsequent attachment of all fittings (ladders, piping, telemetry and control systems, etc.), brings about countless difficulties, most of them related to the winds prevailing at great heights, which hinder the work of operators, the alignment of parts, the leveling of the structure, the quality of the welding and of the finish in general, among other factors. However, the main problem presented by the traditional process of tank construction is the issue of workers safety. Working at heights requires operators to wear safety harnesses, although there is a constant threat of an accidental drop of tools and parts from the top of the construction.

On the other hand, an opening must be kept in the wall of the container at the level of the floor until the last moment in order to ensure the access and exit of materials, tools and personnel as well as to ensure an escape route in case of danger. This opening is the only possible escape route, with the foreseeable consequences if the structure collapses in such sector. Furthermore, the existence of lateral opening forces to keep areas of the roof uncovered in order to avoid air pockets and to evacuate personnel and tools once the lateral opening is sealed when the construction of the tank is finished.

To avoid some of these problems, a series of construction processes was developed, which have as a common feature the fact that all of them start by assembling the ring attached to the roof, and which by means of different hoisting systems such as hydraulic jacks, lift the structure to assemble the second ring welded to the first one. The construction lifting cycle to attach the next ring is repeated as many times as necessary, to end up by placing the whole structure on the floor and thus welding the last ring to it. Finally, the ladders, handrails and other fittings are assembled. These systems, called "from the top and down", avoid the assembly of large parts at height, but still present the safety problems regarding escape routes and work at height at the fittings attachment stage.

Another difficulty brought about by the construction processes hoisting the structure progressively is to ensure the quality of welding and finishes in general. To hold the structure to the hoisting systems, it is necessary to weld additions to the metal sheets which, as handles, serve as temporary support. These additions must be removed once the structure is lifted. Besides, the proximity of the hoisting systems to the wall of the construction hinders the use of automatic welding machines.

Furthermore, the assembly process of the ring strips beginning with individual sheets requires time and a great amount of labor. The vertical welding seam needed to join the sheets forming the ring requires a perfect alignment of the sheets to be welded, a procedure which is hard to perform with the sheets in situ, which forces the hiring of expert welders or the employment of automatic welding machines which must be accurately positioned on every seam by means of rails temporarily welded to the structure under construction and which must be removed afterwards, all of which requires even more time.

In addition, enough space around the structure under construction is required by the assembly of individual sheets, not only for the deployment of materials but also for the movement of machinery of different sizes; space which must be properly conditioned to bear the continuous movement of heavy machinery. The logistics needed to ensure the flow of supply of materials around the structure under construction without neglecting personal safety requires significant coordination efforts, with the constant risk of stoppages due to coordination failure, in addition to the payment of high insurance premiums for the risk operators are exposed to.

Patents like the Spanish patent ES 455.737 disclose ways to counteract these difficulties by building the tank wall with a continuous-strip-shaped sheet which is bent on the construction site and is automatically welded in a helical form, for which the whole structure is held on rolls that make it spin as it is hoisted. However, the use of continuous sheets in coils lacks flexibility since the resulting tanks must necessarily be constructed with sheets of the thickness and characteristics of the coils available in the market, which is sometimes scarce or forces the import of raw materials, with the difficulties concerning costs and time thus required. On the other hand, these processes hinder the construction of large size tanks requiring the use of internal columns to bear the weight of the structure of the roof, since they require the whole structure under construction to spin constantly.

But even in the cases where the space available around the structure is not a critical factor, the considerable construction time is the limiting factor common to all the construction processes previously described in the current state of the art, since these are sequential construction processes, all the assembly process of one ring must be concluded before starting the assembly process of the next ring, process limited by weather conditions such as moderate winds, rains, sandstorms or snowstorms which not only delay construction but also raise the absenteeism rate of specialized personnel due to illnesses caused by such weather conditions.

The present invention claims a novel construction system of structures, preferably cylindrical metal ones, which avoids all the above-mentioned difficulties and reduces construction time considerably using innovative devices such as hydraulic jacks, supporting bases, movable horizontal welding cabinets and sheet forming devices for ring strips, among others.

Without losing generality, from now on the term <<tank>> shall be used to refer to the structure under construction.

BRIEF DESCRIPTION OF THE FIGURES

In order to make the present invention clearly understood, so that there is no difficulty in putting it into practice, it is described in detail as follows, making reference to the illustrative drawings attached, in which:

FIG. 8 shows an upper view of a preferred embodiment of a movable cabinet for external horizontal welding of the present invention.

FIG. 9 shows a side view of a preferred embodiment of a movable cabinet for external horizontal welding of the present invention.

FIG. 10 shows a front view of a preferred embodiment of a movable cabinet for external horizontal welding of the present invention.

FIG. 11 shows an upper view of a preferred embodiment of a movable cabinet for internal horizontal welding of the present invention.

FIG. 12 shows a rear view of a preferred embodiment of a movable cabinet for internal horizontal welding of the present invention.

FIG. 13 shows a side view of a preferred embodiment of a movable cabinet for internal horizontal welding of the present invention.

FIG. 14 shows a front view of a preferred embodiment of a movable cabinet for internal horizontal welding of the present invention.

FIG. 15 shows an upper view of a preferred embodiment of a sheet forming device for ring strips or ring strip forming device of the present invention.

FIG. 16 shows a side view of a preferred embodiment of a sheet forming device for ring strips of the present invention.

FIG. 17 shows a rear view of a preferred embodiment of a sheet forming device for ring strips of the present invention.

In all figures, the same numbers or letters for reference indicate equal or corresponding elements.

BRIEF DESCRIPTION OF THE INVENTION

Figure 1:
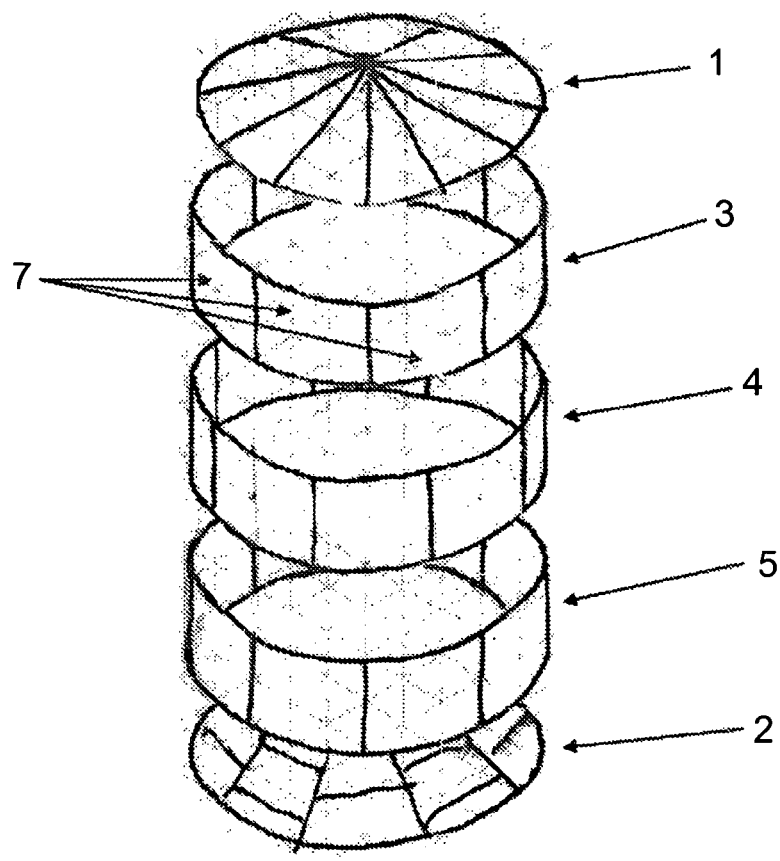
FIGS. 1 and 2 illustrate an exploded view of the components of a tank constructed according to the present invention.

The process of building a tank, which is the object of this invention is of the type called "from top to down assembly", in which the tank is built by welding several rings, one ring to another, each ring comprising a plurality of metal sheets joined together and raising each of them after welding to the upper one.

According to this invention the process of building a tank comprises the steps of forming the rings by welding the metal sheets in a fixed cabinet for vertical welding and alignment of sheets where they are aligned vertically by at least two vertical presses moving horizontally and welded by robots sliding along calibrated vertical rails on both sides of said presses to form at least a strip of a metal sheet or ring strip, being this step of forming the ring strip done simultaneously with horizontal welding among the upper ring strips to which it is shaped.

Moreover, said process of tank construction comprises the following steps:

2.1. Preparing the base of the tank and building the tank floor;

2.2. Placing the supporting base device on the periphery of the tank, linking them by means of rails;

2.3. Placing stretchers for the access and exit of personnel, tools and materials at selected points on the periphery of the tanks among said supporting base devices;

2.4. Placing at least one sheet forming device for the ring strips with at least one fixed cabinet for the vertical welding and alignment of sheets tangential to the periphery of the tank;

2.5. Assembling, in said fixed cabinet for the vertical welding and alignment of sheets, a strip of metal sheet, where the total length of said strips is at least the same length of the circumference of the desired ring, and to move said strips until they are placed on said supporting base devices on the external circle so that they are taken to the internal circle;

2.6. Finishing the first ring on said supporting base devices performing the vertical welded seam between the extremes of said strip;

2.7. Optionally, building the roof of the tank attached to the upper end of said first ring and the first stretches of the internal columns of the tank;

2.8. Placing collapsible lifting devices along the circumference of said first ring, on the internal side of the tank and at each of said internal columns of the tank, of a length equal to the height of said first ring;

2.9. Shaping the following ring by means of metal strips assembled in said fixed cabin of vertical welding and alignment of sheets at the same time that the operations described on the previous ring are carried out, and to place the following said ring externally, concentrically regarding the previous said ring, on said supporting base devices on the external circle;

2.10. Lifting by said collapsible lifting devices the set of ring strips-roof-stretches of internal columns;

2.11. Moving said following ring to its final position on said supporting base device and on the internal circle and performing the last vertical welding to finish shaping the following ring;

2.12. Lowering the set of ring strips-roof-stretches of internal columns on said following ring by means of said collapsible lifting devices, and placing spacers between them.

2.13. Welding the lower rim of the upper ring of the set ring strips-roof-stretches of internal columns with the upper rim of said following ring, and welding new stretches of columns to said stretches of internal columns;

2.14. Repeating steps 2.9 to 2.13 as many times as necessary to obtain the desired height for the tank;

2.15. Removing the supporting base devices from the periphery of the tank and said ring shapers and said stretchers for the access and exit of personnel, tools and materials;

2.16. Using the collapsible lifting devices, lowering the set of ring strips-roof-stretches of internal columns so that it rests on the tank floor.

2.17. Removing said collapsible lifting devices and welding the lower rim of the lower ring and of the bases of the internal columns of the set of ring strips-roof-stretches of internal columns with the tank floor.

2.18. Performing minor operations to finish the tank structure.

Where each supporting base device (100) comprises at least two ring strip guide devices (110), one on the internal circle which defines the final size of the tank to be built and the other on the external circle, which receives the following ring while the steps of welding, finishing and hoisting of the previous ring strips are executed. Moreover, said sheet forming device for ring strips comprises a base, legs of adjustable height, rolls to guide the sheets and at least one fixed cabinet for vertical welding and alignment of sheets, and where said base is a double T iron profile of a greater length than the length of each sheet forming the ring, and said legs of adjustable height are placed in pairs, one at each side of the base, and are selected from the group comprising hydraulic, pneumatic or mechanical pistons. And said rolls to guide sheets of said shape forming device for ring strips are positioned on said base horizontally and perpendicularly to the main axis of the base, vertically to each side of said base, in pairs, separated by a greater distance than the width of the sheets forming the ring and at different heights to allow for the movement of the sheets arranged vertically.

Moreover, said fixed cabinet for vertical welding and alignment of sheets of said sheet forming device is a closed and air-conditioned cabinet, having enough room to accommodate at least one operator and at least one welding equipment, with corresponding openings on both opposite sides, where said base and the sheets assembled on it cross, comprising:

6.1. A double system of vertical presses selected from the group comprising hydraulic, pneumatic or mechanical presses, placed in such a manner that each of said presses press a sheet, keeping the sheets to be welded aligned at an optimal distance to perform the welding between them.

6.2. vertical rails, calibrated at both sides of said presses, located in such a manner that they allow for the movement of the corresponding welding robots along them;

6.3. hydraulic presses and welding robots control systems;

6.4. accessory systems selected from the group comprising control of internal air conditioning, lighting control, welding quality control, sheet positioning control, remote control systems, monitoring systems and internal steps;

6.5. optional coatings for the walls and roof, selected from the group comprising thermal and acoustic insulation.

Supporting base device comprising a supporting body, at least one leveling element, rails and at least two ring strips guiding devices. Where said supporting body of said supporting base device is a double T iron profile, and said leveling elements are selected from the group comprised by hydraulic, pneumatic or mechanical pistons and said rails are welded on the upper part of said bases in a ring-shaped manner, and allow for the movement of movable cabinets for horizontal welding along them. Furthermore, said guiding devices for ring strips comprise:

10.1. a reinforced sheet structure, of the proper geometry to fit said base so as to be used as a runner having a horizontal flat upper side;

10.2. at least two horizontal rolls arranged on the flat upper side of said structure of reinforced sheet, which allows for the shifting of ring strips.

10.3. at least three removable and interchangeable horizontal rolls, arranged on the flat upper side of said structure of reinforced sheet, which allow the shifting and shaping of ring strips.

10.4. at least one removable and interchangeable pulley wheel, arranged on the flat upper side of said structure of reinforced sheet, which allows for guiding wires to pull the ring strips.

Moreover, in the process of the invention the horizontal welding of the ring strips is performed by means of movable cabinets for external and internal horizontal welding, sliding along said rails.

Where said movable cabinets for external horizontal welding comprise:

12.1. a closed and air-conditioned cabinet, having enough room to accommodate at least one operator and one welding equipment, and at least one window to allow the welding equipment to approach the ring strips to weld, and of the proper geometry to move in a circular manner along the periphery of the tank between two parallel ring strips located in the internal circle and in the external circle;

12.2. ladder and handrails to provide a safe working environment for the operators on the roof of the external welding cabinet;

12.3. at least three wheels for the movement along said rails;

12.4. at least one calibrated horizontal rail, located at such a height that it allows the movement of at least a welding robot on it to perform the horizontal seam between ring strips;

12.5. at least an engine for the movement of the welding cabinet, with at least one driving wheel;

12.6. engine control systems for the movement of the welding cabinet and welding robots;

12.7. accessory systems selected from the group comprising control of internal air conditioning, lighting control, welding quality control, sheet positioning control, remote control systems, monitoring systems, internal steps;

12.8. optional coatings for the walls and roof, selected from the group comprising thermal and acoustic insulation.

While said movable cabinets for internal horizontal welding move along said rails and on wheels and comprise:

13.1. a closed and air-conditioned cabinet, having enough room to accommodate at least one operator and one welding equipment, and at least one window to allow the welding equipment to approach the ring strips to weld, and of the proper geometry to move in a circular manner along the internal circumference of the tank;

13.2. at least one calibrated horizontal rail, located at such a height that it allows the movement of at least a welding robot on it to perform the horizontal seam between ring strips;

13.3. at least one wheel for the movement along said rails and at least one wheel for the movement on the tank floor;

13.4. at least an engine for the movement of the welding cabinet, with at least one driving wheel;

13.5. engine control systems for the movement of the welding cabinet and welding robots;

13.6. accessory systems selected from the group comprising control of internal air conditioning, lighting control, welding quality control, sheet positioning control, remote control systems, monitoring systems and internal steps;

13.7. optional coatings for the walls and roof, selected from the group comprising thermal and acoustic insulation.

The process of the present invention comprises the movement of ring strips by means of a traction winch and a wire linked to the ring strips by a metal sheet welded to one end of the ring.

Moreover, as a previous step prior to the assembly of the first ring, a central mast is erected, which can be used as a guide during the lifting operation of said set of ring strips-roof-stretches of internal columns, and which acts as a central column once the construction of the tank is complete.

On the other hand, the process of the invention preferably considers that the step of vertical welding between the ends of the metal sheet forming the ring strips is performed outside the periphery of the tank; i.e. on the external circle or on its tangential line, with the exception of the last vertical weld.

Another object of the present invention is a sheet forming device for ring strips comprising a base, legs of adjustable height, rolls to guide the metal sheets and at least one fixed cabinet for vertical welding and alignment, where said base is a double T iron profile of a greater length than the length of each sheet forming the ring, and said legs of adjustable height are placed in pairs, one at each side of the base, and are selected from the group comprising hydraulic, pneumatic or mechanical pistons. Furthermore, said rolls to guide the metal sheets are arranged on said base horizontally, perpendicularly to the main axis of the base, vertically to each side of the base, in pairs, separated by a greater distance than the width of the sheets forming the ring and at different heights to allow the movement of the sheets placed vertically.

Another object of the present invention is a fixed cabinet for vertical welding and alignment of sheets comprising a closed and air-conditioned cabinet, having enough room to accommodate at least one operator and at least one welding equipment, with corresponding openings on both opposite sides, crossed by said base and the sheets assembled on it, comprising:

20.1. at least two vertical presses selected from the group comprising hydraulic, pneumatic or mechanical presses, placed in such a manner that each presses a sheet, keeping the sheets to be welded aligned at an optimal distance to perform the welding between them.

20.2. vertical rails, calibrated at both sides of said presses, located in such a manner that they allow for the movement of the corresponding welding robots along them;

20.3. hydraulic presses and welding robots control systems;

20.4. accessory systems selected from the group comprising control of internal air conditioning, lighting control, welding quality control, sheet positioning control, remote control systems, monitoring systems, internal steps;

20.5. optional coatings for the walls and roof, selected from the group comprising thermal and acoustic insulation.

Another object of the present invention is a supporting base device comprising a supporting body, at least one leveling element, rails and at least two ring strips guiding devices. Where said supporting body is a double T iron profile, and said leveling elements are selected from the group comprising hydraulic, pneumatic or mechanical pistons. And where said rails are welded on the upper part of said bases in a ring-shaped form, and allow for the movement of movable horizontal welding cabinets along them. Furthermore, these ring strips guiding devices comprise:

24.1. a reinforced sheet structure, of the proper geometry to fit said base so as to use it as a runner having a horizontal flat upper side;

24.2. at least two rolls of a horizontal shaft arranged on the flat upper side of said structure of reinforced sheet, which allows for the shifting of ring strips.

24.3. at least three rolls of a vertical shaft, removable and interchangeable, arranged on the flat upper side of said structure of reinforced sheet, which allows for the shifting and forming of ring strips.

24.4. at least one removable and interchangeable pulley wheel, arranged on the flat upper side of said structure of reinforced sheet, which allows for guiding wires to pull the ring strips.

Another object of the present invention are the movable cabinets for external horizontal welding which slide on rails and comprise:

25.1. a closed and air-conditioned cabinet, having enough room to accommodate at least one operator and one welding equipment, and at least one window to allow the welding equipment to approach the ring strips to weld, and of the proper geometry to move in a circular manner along the periphery of the tank between two parallel ring strips;

25.2. ladder and handrails to allow the safe work of operators on the roof of the external welding cabinet;

25.3. at least three wheels for the movement along said rails;

25.4. at least one calibrated horizontal rail, located at such a height that it allows the movement of at least a welding robot on it to perform the horizontal seam between ring strips;

25.5. at least an engine for the movement of the welding cabinet, with at least one driving wheel;

25.6. engine control systems for the movement of the welding cabinet and welding robots;

25.7. accessory systems selected from the group comprising control of internal air conditioning, lighting control, welding quality control, sheet positioning control, remote control systems, monitoring systems, internal steps;

25.8. optional coatings for the walls and roof, selected from the group comprising thermal and acoustic insulation.

Another object of the present invention are the movable cabinets for internal horizontal welding which slide on rails and comprise:

26.1. a closed and air-conditioned cabinet, having enough room to accommodate at least one operator and one welding equipment, and at least one window to allow the welding equipment to approach the ring strips to weld, and of the proper geometry to move in a circular manner along the internal circumference of the tank;

26.2. at least one calibrated horizontal rail, located at such a height that it allows the movement of at least a welding robot on it to perform the horizontal seam between ring strips;

26.3. at least one wheel for the movement along said rails and at least one wheel for the movement on the tank floor;

26.4. at least an engine for the movement of the welding cabinet, with at least one driving wheel;

26.5. engine control systems for the movement of the welding cabinet and welding robots;

26.6. accessory systems selected from the group comprising control of internal air conditioning, lighting control, welding quality control, sheet positioning control, remote control systems, monitoring systems, internal steps;

26.7. optional coatings for the walls and roof, selected from the group comprising thermal and acoustic insulation.

DETAILED DESCRIPTION OF THE INVENTION

There follows a description of the invention as to the construction process of tanks as well as of each of the devices it uses by means of the drawings described and by a description which gives the best examples known by the inventors to date. These examples which form part of the present memory are given to enable a better understanding, without this implying limiting the protection applied for.

Figure 2:
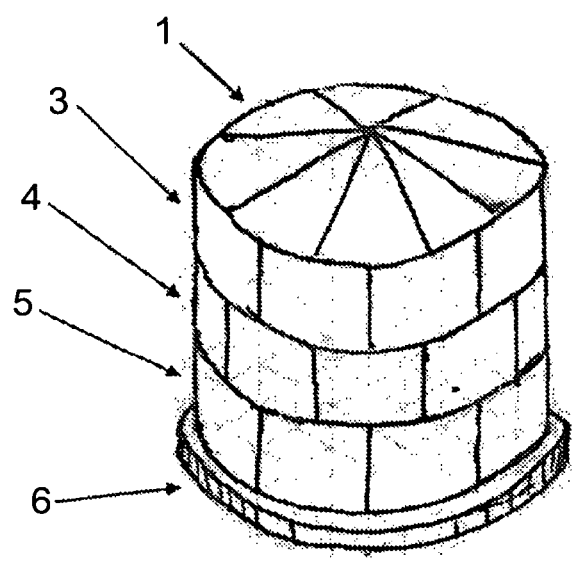

FIGS. 1 and 2 show a typical tank like those built by the process of the present invention, but without limiting to this type, which comprises a metal roof (1), a metal wall and a metal floor/base (2) built on a concrete tank foundation (6) generally elevated over floor level. The metal roof (1) rests on a structure of metal beams, which in turn can be supported by metal columns distributed inside the tank. The metal wall of the tank is formed by rings of metal sheets (3) (4) (5) welded one on top of the other. Each ring, for example ring (3), is in turn formed by bent rectangular metal sheets (7) which are welded one next to the other to form a ring.

In the present description, ring (3) located on the upper part of the tank, attached to roof (1) shall be called "ring one" or "first ring"; ring (4) welded to the first one shall be called "ring (2)" or "second ring", and so on until the "last ring" or "lower ring", being the name referring to ring (5) located on the lower part of the tank wall, attached to the floor (2). Moreover, a typical tank like those built by the process of the present invention, without being limited to this type, has several accessory structures such as handrails on the roof periphery, ladders on the walls, piping, inspection gates, measuring and control systems, auxiliary services systems, etc., all of them being habitual structures in this type of constructions and with their own characteristics according to the use meant of the tank.

At first, the tank foundation (6) is prepared according to the traditional processes established and disclosed broadly in the current state of the art, thus granting a flat and suitable surface to settle it.

The tank floor (2) is built on the tank foundation (6) placing sheets of the suitable thickness regarding the use meant and dimensions of the tank, welding the sheets by their ends and cutting the peripheral sheets to achieve the desired shape of the tank base.

An alternative to the present invention is the construction of a tank without the presence of any mast or column.

Another preferred alternative of the present invention consists in assembling a central mast. In such a case, the central mast (8) of the tank is placed. The constituting parts of the central mast (8) are carefully assembled on the floor, so that the central mast (8) is raised as a unique part and it subsequently serves as a guide for the movement of the roof (1) during the process of hoisting the structure.

On the periphery of the base (2) of the tank, where the tank walls are to be subsequently built, the supporting base devices (100) are placed in a circular manner having the mast (8) as a center, equidistant one to the others, in a number that is proportionate to the final weight of the tank. The structure of the tank under construction is to be settled on these devices.

Figure 3:
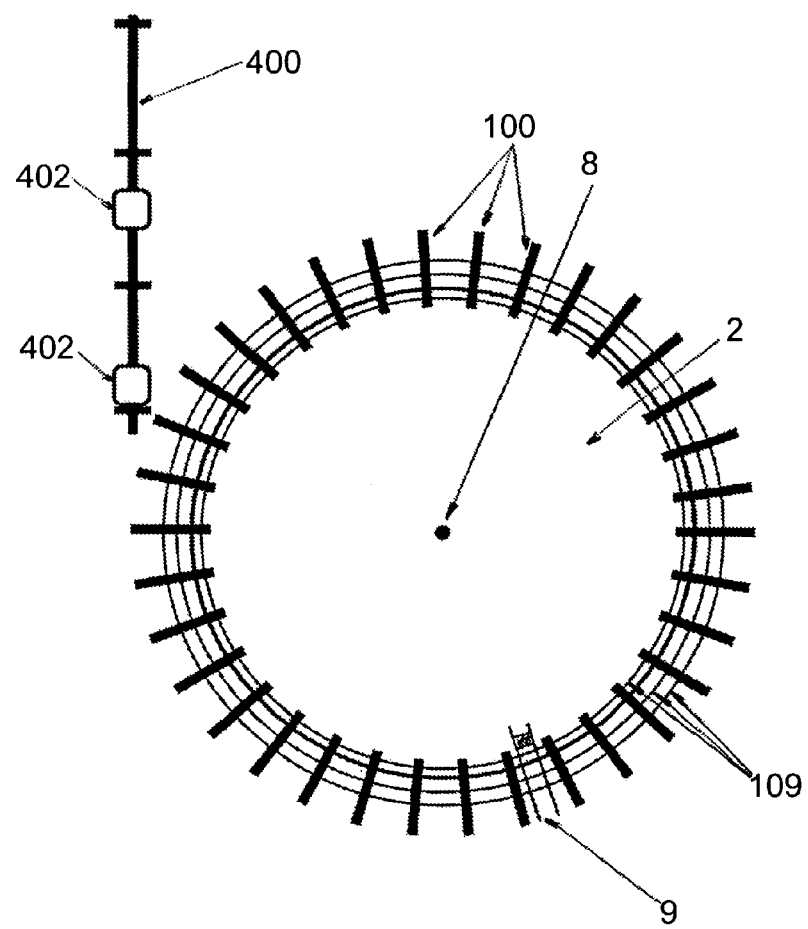
FIG. 3 outlines a preferred distribution of the main components of the assembly process of the present invention from an upper view.

FIG. 3 illustrates a preferred distribution of the supporting base devices (100) around a central mast (8).

The supporting base devices (100) do not only serve as a support for the structure of the tank under construction, but also allows bending of the ring strips in situ and independently from the extra devices, they provide the personnel with a safe escape route, alleviate the pressure of winds on the structure and serve as a support and guide for the movable cabinets for horizontal welding, all this without the need to perform de-welding operations on the tank to remove them. However, in an alternative of the present invention, said supporting devices (100) may be welded to the base of the tank (2) under construction.

Figure 4:
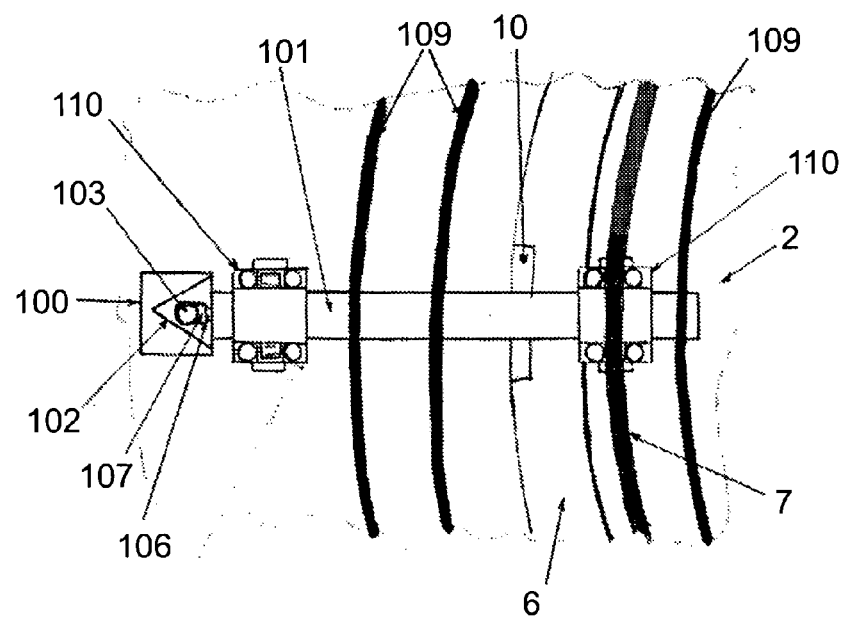
FIG. 4 shows an upper view of a preferred embodiment of a supporting base device of the present invention.
Figure 5:
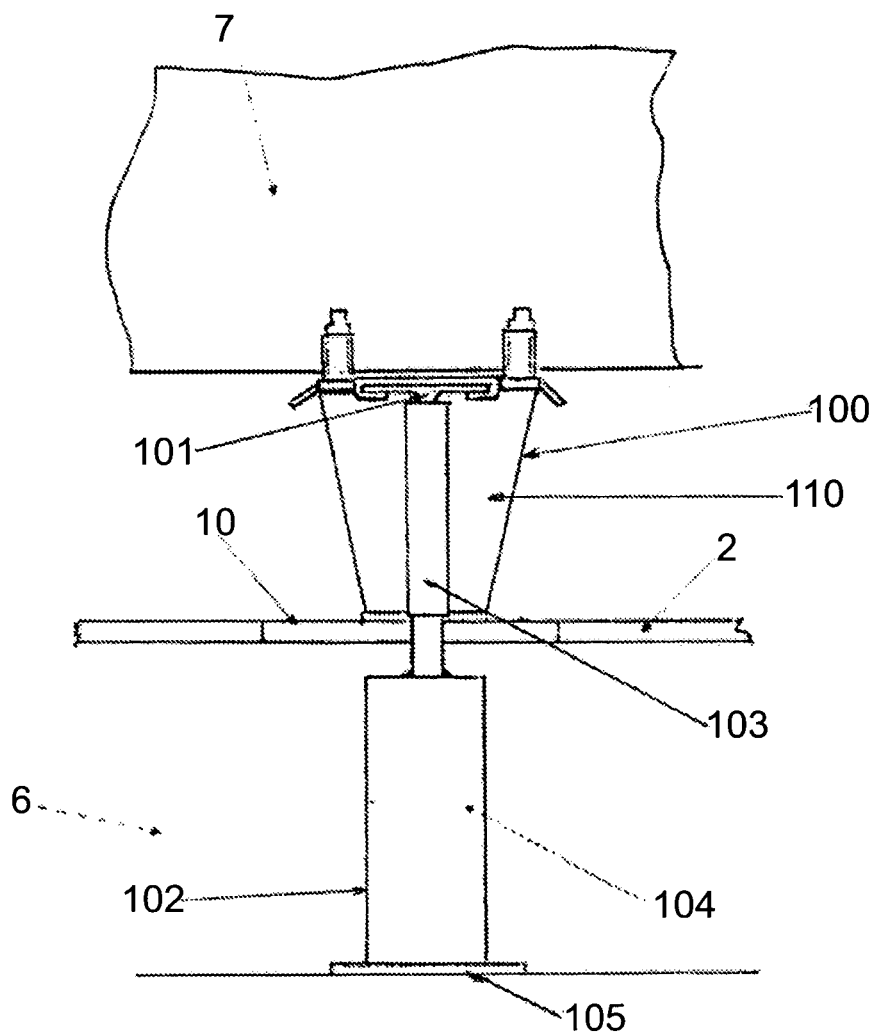
FIG. 5 shows a front view of a preferred embodiment of a supporting base device of the present invention.
Figure 6:
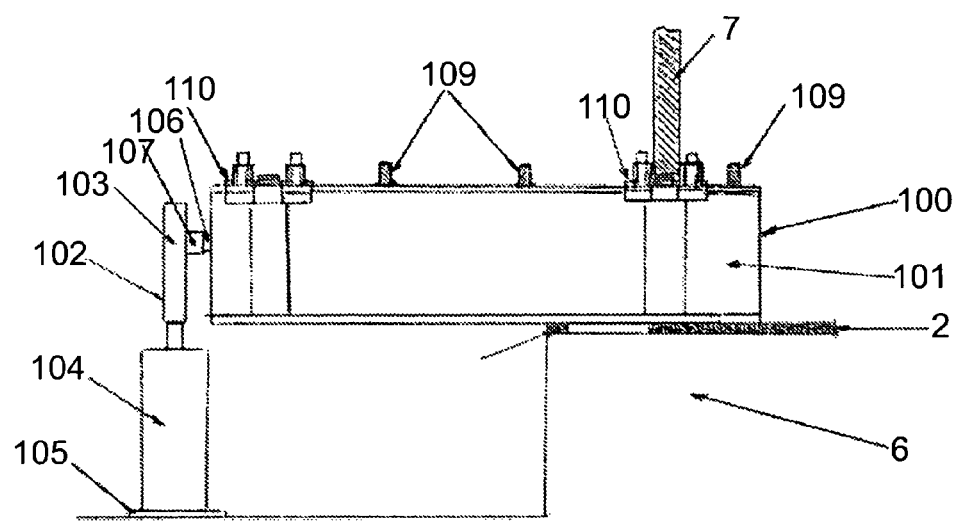
FIG. 6 shows a side view of a preferred embodiment of a supporting base device of the present invention.

FIGS. 4 to 6 show a preferred embodiment of the supporting base devices (100), each of which consists of a supporting body (101) linked to at least two rails (109) for the movement of movable cabinets for horizontal welding; moreover said supporting base devices comprise at least one leveling element (102) and at least two ring strip guide devices (110).

The supporting body (101) is supported on one end by the tank floor (2), whereas on the opposite end of the supporting body (101), a leveling element (102) linked to the supporting devise is placed on the external side of the tank. In a preferred embodiment of the present invention said leveling element (102) is linked to the supporting device by means of a solid metal shaft (106) welded to the supporting body (101) which is inserted in a metal tube (107) welded to the leveling element (102). Said leveling element (102) rests on the floor, and optionally it can be anchored to the floor by several means such as bolts, welding, etc.

If necessary, a supplement (10) is placed, constituted by a piece of metal sheet of the same thickness as the tank floor (2) on the edge of the foundation (6) to extend the supporting surface of the supporting body (101).

The supporting body (101) is able to stand in position on the desired surface, as for example the tank floor (2) of a tank under construction, without the need for welding, supports or additions. However, the invention foresees the possibility of a couple of welding points to facilitate the positioning. This supporting body (101) not only serves as a base and support for the structure under construction, but also acts as a base and support for the ring strip guide devices (110) and as an anchor for the rails (109) along which the movable cabinets for horizontal welding slide, also allowing the use of free space as an escape route or for the transportation of material, tools and personnel between the external and internal parts of the structure under construction.

In a first preferred embodiment, the supporting body (101) comprises a double T profile, and in a second embodiment it comprises an extensible beam.

In addition, a leveling element (102) in a first preferred embodiment comprises a support of adjustable height (103) able to be linked to one of the ends of the supporting body (101) so as to grant stability and support to the set when part of the supporting body (101) is suspended in the air, as in the case of the construction of tanks when the base of the tank is on a higher level than the rest of the ground.

In a preferred embodiment, the support of adjustable height (103) is selected from the group comprised by helical screw jacks, hydraulic pistons, pneumatic hoisting systems and mechanic systems of adjustable height.

In a preferred embodiment, the leveling element comprises the helical screw jack welded to a column or metal box (104) attached with a metal base which is able to be anchored, bolted or welded to the floor.

Ring strip guide devices (110) are constituted by a structure of reinforced sheet, in a way that it fits the geometry of the supporting body (101) and allows the movement along it, thus allowing to regulate its location at the desired place along said supporting body (101). Horizontals rollers (111) and interchangeable vertical rollers (112) which allow the controlled movement of ring strips are attached to said structure of reinforced sheet. Moreover, each device to guide ring strips has at least one interchangeable pulley wheel (113) to guide the traction wire used to move the ring strips.

Figure 7:
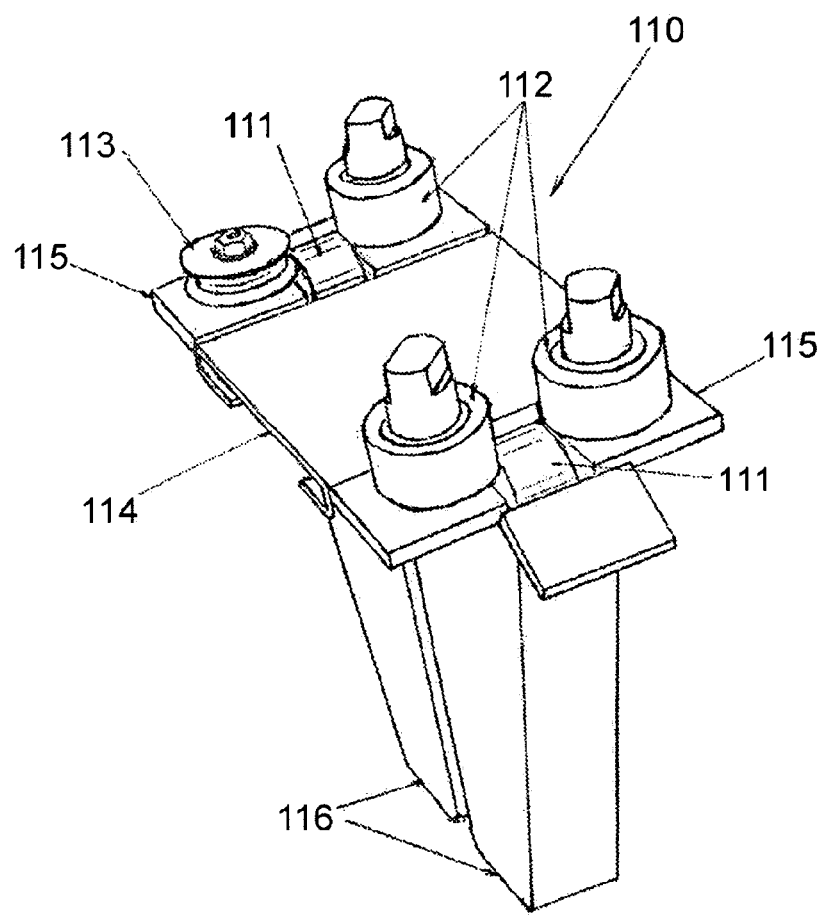
FIG. 7 shows a perspective view of a preferred embodiment of a ring guide device of the supporting base device of the present invention.

In a preferred embodiment, illustrated in FIG. 7, said structure of reinforced sheet belonging to the device for guiding the ring strip guide devices (110) comprises a horizontal sheet folded at two of its opposite edges (114) which, as clamps surround the upper side of a double T profile acting as a supporting body, to which horizontal sheets of extension (115) and vertical folded sheets of structural reinforcement (116) are welded on both folded ends. Said horizontal sheets of extension (115) have perforations through which the shafts of the corresponding vertical rolls (112) or pulley wheels (113) pass, located in a position to allow the sliding of a sheet (7) placed vertically between them. Said vertical rolls (112) or pulley wheels (113) are interchangeable, which enables implementing several configurations for them, and in a preferred embodiment three vertical rolls (112) and one pulley wheel (113) are installed at each device for guiding ring strip guide devices (110). Said reinforcement vertical folded sheets (116) have corresponding horizontal rolls (111) located in such a position that they allow the movement of a sheet (7) placed in vertical position on them.

In a preferred embodiment, the height of the supporting base devices (100) is of at least 400 mm, allowing the free passing of operators under the structure of the tank under construction and the rails, particularly by using a fitting designed for that purpose. This fitting applicable to the structure of the present invention, which shall be called inter-wall transport device (9) is formed by pairs of rails positioned on the floor and link the internal to the external part of the container or piece under construction, on which laminar bodies move as stretchers to support an operator's back, with wheels capable of rolling along said rails, thus allowing to cross the container from the inside to the outside and vice versa easily and promptly. Said inter-wall transport device (9) by means of which operators are able to slide comfortably to access or exit the container, promptly and efficiently, allows the lack of need of any other escape route, avoiding the final job of welding sheets on the holes usually left on the walls of the structure under construction to access the container being constructed.

Inter-wall transport devices (9) constitute a system that facilitates the circulation of people and objects inside and outside the tank under construction, providing a fast route of escape and also avoiding safety problems, such as the risk of generating sparks which could be originated from dragging heavy metal objects along the tank floor, or the risk of personal injury.

An object of the present invention are said inter-wall transport devices (9) which are metal stretchers sliding on metal rails temporarily welded to the floor of the tank and which comprise bearings attached to said stretchers, the rotating shafts of which are placed at an angle of between 10° and 50° sexagesimals regarding the horizontal one, preferably, between 20° and 45°. Thus, maximum safe for the personnel and durability of bearings is achieved, and the risk of derailment of said stretchers, which in case of an emergency can result in the loss of human lives. Evidently, the inclination of said bearings is outwards from the stretcher, being the wheels "open" regarding the body of the stretcher. In the present invention there are two alternatives: said bearings are roller-bearings and said rails are U profiles also sloping to receive the bearings moving within the U, or said bearings have a concave external surface allowing them to fit on a cylindrical metal rail (tube).

FIG. 3 outlines the position of an inter-wall transport device (9) in the distribution of the main components of the present invention.

After positioning the supporting base devices (100) the inter-wall transport devices (9) are assembled on the periphery of the tank floor (2) and between the supporting base devices (100) in a suitable number according to the needs of transport of personnel, tools and materials. The number of inter-wall transport devices (9) to be used shall depend on factors such as the number of operators working simultaneously inside the structure under construction, the number of sector meant for loading and unloading of raw materials and tools, the existing room around the structure under construction, etc.

After or simultaneously with the installation of said inter-wall transport devices (9), the ring strip guide devices (110) are set in an appropriate position on the supporting bodies (101) of each supporting base device (100). On each supporting base device (100) a ring strip guide device (110) is located on the periphery of the tank, near the internal end on the supporting body (101) in such a position that a ring moving on it reaches the right place to be welded to the structure of the tank under construction.

In a preferred embodiment, at least one device for guiding ring strip guide devices (110) is located on the external end, on the supporting body (101) of each supporting base device (100) at such a distance from the internal ring strip guide device (110) that it allows to position a movable cabinet of horizontal external welding (300) between both ring strip guide devices (110). Thus, at least two circular spaces demarcated by the location of said devices for guiding ring strip guide devices (110) are fixed: an internal circle constituting the space to be taken by the tank, and an external circle in which the ring under construction is located, before passing to the internal circle to be welded as part of the tank under construction. This allows to save much time, since while a ring is being welded in said internal circle, the next ring can be formed simultaneously. Said internal circle is defined by the vertical shaft rolls (112) which are positioned on what shall be the internal side of the tank wall. This is an essential characteristic of the innovation, since the final position of the tank shall be given by the location of said vertical rolls (112) which will be in contact with the internal side of the ring walls, positioned on said internal circle. This allows a total control of the shape and positioning of the tank under construction. In the state of the art there are systems that guide sheets with V-shaped seats, which causes position differences depending on the thickness of the sheets to be formed. In the present invention the final position of the tank only depends on the location of the internal vertical rolls (112) of the devices guiding the ring strip guide devices (110) forming said internal circle. Notice that the advantage provided by this novel system of ring positioning is that the internal diameter of the tank shall be the same along the whole height of the tank, even though the sheets of the different ring strips are of a different thickness. The use of different thicknesses according to the height of the tank is usual in the construction of large tanks.

In brief, in each supporting base device (100) there are at least two ring strip guide devices (110), one on the internal circle which defines the final size of the tank to be built and the other on the external circle which receives the following ring while the steps of welding, finishing and hoisting of the previous ring strips are executed.

Then, ring-shaped rails (109) are welded on the upper horizontal side of the supporting bodies (101) of each supporting base device (100), joining them. Said rails (109) allow the transport of the movable cabinets for horizontal welding following the periphery of the structure under construction, at the same time they provide structural rigidity to the set of supporting base devices (100).

In a preferred embodiment, said rails (109) are formed by strips of metal sheets welded in vertical position to said supporting bodies (101) of each supporting base device (100).

In a preferred embodiment, two ring-shaped rails (109) are installed on the external side of the tank under construction, between two devices to guide ring strip guide devices (110), for the movement of the external movable cabinets for horizontal welding (200) and a ring-shaped rail (109) on the internal side of the tank under construction for the movement of the internal movable cabinets for horizontal welding (300).

FIG. 4 shows a preferred distribution of the components of said supporting base device (100)

Afterwards or simultaneously with the previous operations, at least one sheet forming device for the ring strips (400) is placed tangentially to the periphery of the tank.

Ring strip forming device (400) allows the concatenation of individual metal sheets arranged in vertical position so as to obtain a continuous strip of sheets of the necessary length to form a ring for the tank under construction, aligning the edges of two consecutive sheets in a precise and fast manner, so as to allow the use of a welding robot which guarantees an optimal finish and a substantial decrease of the time necessary for the welded seam, at the same time that ensures optimal safety conditions for operators, the maximum finish quality and provides protection against weather conditions so as to allow continuous operations under adverse conditions.

A preferred embodiment of the sheet forming device for the ring strips (400) is illustrated in FIGS. 15, 16 and 17 where due to clarity and generality the fixed cabinet for vertical welding and alignment of sheets (402) is not shown.

The sheet forming device for the ring strips (400) comprises a base (401), at least one cabinet for vertical welding and alignment of sheets (402), legs of adjustable height (403) and vertical rollers (404) and horizontal rollers (405) guide the metal sheets.

In a preferred embodiment, the base (401) of said sheet forming device for the ring strips (400) is a double T iron profile of a length at least equal to the length of one of the individual sheets which are concatenated to form each ring.

In a preferred embodiment, said legs of adjustable height (403) of said sheet forming device for the ring strips (400) are set in pairs, one at each side of the base, and are formed by a double T profile of the same dimensions as said base (401) welded perpendicularly to said base (401) and an extensible element (406) selected from the group comprised by hydraulic, pneumatic or mechanical pistons set on the external end of said profile.

The rollers (404, 405) to guide the metal sheets of said shape forming device for ring strips are set on said base horizontally and perpendicularly to the main axis of the base, vertically to each side of said base, in pairs, separated by the same distance as the width of the sheets forming the ring and at different heights to allow for the movement of the sheets arranged vertically.

Each fixed cabinet for vertical welding and alignment of sheets (402) of said sheet forming device for the ring strips (400) is a closed and air-conditioned cabinet, having enough room to accommodate at least one operator and one welding equipment, having corresponding openings on both opposite sides, sealed by curtains, where the fixed cabinet for vertical welding and alignment of sheets (402) is totally crossed by said base (401) and the sheets assembled on it. Each fixed cabinet for vertical welding and alignment of sheets (402) of said sheet forming device for the ring sheets (400) also contains at least two vertical presses (407) selected from the group comprising hydraulic, pneumatic or mechanical presses, set in such a manner that each press presses one sheet, keeping the sheets to be welded aligned at an optimal distance to perform the welding between them, and where said presses move horizontally, i.e., the presses are comprised by two brake shoes moving horizontally approaching the sheets in successive parallel positions; calibrated vertical rails (408) at both sides of said presses located in such a manner that they allow the movement of the corresponding welding robots along them; control systems (409) of the hydraulic presses and of welding robots and accessory systems selected from the group comprising internal air conditioning control, lighting control, welding quality control, sheet positioning control, remote control systems, monitoring systems. The step of the process which is performed in these fixed cabinets for vertical welding and alignment of sheets which consist in the vertical alignment of sheets and their automatic welding to form the strip which shall originate the ring, may be executed simultaneously with the step of horizontal welding between the upper ring strips being formed.

The fixed cabinet for vertical welding and alignment of sheets (402) of said sheet forming device for the ring strips (400) are installed at an equal distance to the length of the sheets to be concatenated so that welding can be performed simultaneously. The number of fixed cabinets for vertical welding and alignment of sheets to be used is limited only for the room available to place them.

In a preferred embodiment, the roof of the fixed cabinets for vertical welding and alignment of sheets (402) is made of metal sheets of a suitable thickness to bear the accidental drop of tools or other objects from the height of the tank under construction, so that personnel working inside is protected.

In a preferred embodiment, the walls of the fixed cabinets for vertical welding and alignment of sheets (402) are coated with a thermal insulation material to provide personnel working inside with comfort and decrease the energy expenditure of the internal air conditioning control systems, if present.

In another preferred embodiment, the walls of the fixed cabinet for vertical welding and alignment of sheets (402) are coated with an acoustic insulation material so as to provide personnel working inside with comfort.

In a preferred embodiment, a sheet forming device for the ring strips (400) is placed tangentially to the periphery of the tank under construction as outlined in FIG. 3.

In another preferred embodiment, multiple sheet forming devices for the ring strips (400) are set tangentially to the periphery of the tank under construction, allowing the generation of corresponding sheet strips for ring strips simultaneously.

The versatility in the location as well as in the number of sheet forming devices for the ring strips (400) to be used is another novel advantage for the process of the present invention, which allows optimizing the use of space available in the surroundings of the construction place.

In a preferred embodiment of the present invention, said fixed cabinets for vertical welding and alignment of sheets (402) are placed on said external circle, which allows performing vertical welding of sheets already rolled. This alternative enables the forming of ring strips from metal sheets of over % thickness which required being bent before the forming of ring strips.

After the assembly of said rails (109) on said supporting and sheet forming device (100), at least one movable cabinet for external horizontal welding (200) and at least one movable cabinet for internal horizontal welding (300) are placed on them.

A preferred embodiment of a movable cabinet for external horizontal welding (200) is outlined in FIGS. 8, 9 and 10.

The movable cabinet for external horizontal welding (200) slide along said rails (109) installed on the external side of said internal circle delimiting the periphery of the tank to be constructed and comprises a closed and air-conditioned cabinet (201), having enough room to accommodate at least one operator and one welding equipment, having at least one window on the front to allow the approach of the welding equipment to the ring strips to weld, sealed by curtains and of a suitable geometry to move in a circular manner along the periphery of the tank between two parallel ring strips; ladders and handrails to allow the safe work of operators on the roof of the external welding cabinet which enable their use as movable scaffolding; at least two wheels (202) to slide on said rails; at least one calibrated horizontal rail, located at a height enabling the movement of at least one welding robot along it to perform the horizontal welded seam between ring strips; at least one engine (203) for the movement of the welding cabinet, with at least one driving wheel (204); engine control systems for the movement of the welding cabinet and the welding robots; and accessory systems selected from the group comprising internal air-conditioning control, lighting control, welding quality control, sheet positioning control, remote control systems, monitoring systems.

In a preferred embodiment, the movable cabinets for external horizontal welding (200) are made up of a reinforced metal structure, and from an upper view it appears as a shape imitating approximately the circular arc described by the ring strips of the tank under construction, as outlined in FIG. 8. In this preferred embodiment, each movable cabinet for external horizontal welding has three free wheels (202) and a driving wheel (204) of the pulley-wheel type, for the sliding movement on two rails (109) and said movement is achieved due to an electric or combustion engine (203) which drives said driving wheel (204)

In a preferred embodiment, the roof of the movable cabinets for external horizontal welding (200) is made of metal sheets of a suitable thickness to bear the accidental drop of tools or other objects from the height of the tank under construction, so that the personnel working inside is protected, and to bear the circulation of operators and tools so that it can be used as movable scaffolding.

In a preferred embodiment, the walls of the fixed cabinets for external horizontal welding (200) are coated with a thermal insulation material to provide personnel working inside with comfort and decrease the energy expenditure of the internal air conditioning control systems, if present.

In another preferred embodiment, the walls of the movable cabinet for horizontal external welding (200) are coated with an acoustic insulation material so as to provide personnel working inside with comfort.

A preferred embodiment of a movable cabinet for external horizontal welding (300) is outlined in FIGS. 11, 12, 13 and 14.

The movable cabinets for internal horizontal welding (300) slide on said rails (109) located inside said internal circle and on the tank floor (2); though the present invention also foresees their movement by means of wheels or rails on the tank floor (2). Said movable cabinets for internal horizontal welding (300) comprise a closed and air-conditioned cabinet (301), having enough room to accommodate at least one operator and one welding equipment, having at least one window on the front sealed by curtains to allow the approach of the welding equipment to the ring strips to weld, and of a suitable geometry to move in a circular manner along the internal circumference at least one calibrated horizontal rail (302), located at a height enabling the movement of at least one welding robot along it to perform the horizontal welded seam between ring strips; at least one wheel (303) for the movement along said rails (109) and at least one wheel (304) for the movement on the tank floor; at least one engine (305) for the movement of the welding cabinet with at least one driving wheel, engine control systems for the movement of the welding cabinet and welding robots; and accessory systems selected from the group comprising internal air-conditioning control, lighting control, welding quality control, sheet positioning control, remote control systems, monitoring systems, steps (306).

In a preferred embodiment, said movable cabinets for internal horizontal welding (300) comprise a reinforced metal structure, and its front view shows a shape imitating approximately the circular arc described by the ring strips of the tank under construction. In this preferred embodiment, each movable cabinet for internal horizontal (300) has on its front a free pulley-wheel (303) and a pulley-wheel type driving wheel (307) for rolling over a rail (109), and on its rear two free wheels (304) to move on the tank floor, and said movement is achieved by means of an electric or combustion engine (305) which drives said driving wheel.

In a preferred embodiment, the roof of the fixed cabinets for internal horizontal welding (300) is made of metal sheets of a suitable thickness to bear the accidental drop of tools or other objects from the height of the tank under construction, so that personnel working inside is protected and to bear the circulation of operators and tools so that it can be used as movable scaffolding.

In a preferred embodiment, the walls of the fixed cabinets for internal horizontal welding (300) are coated with a thermal insulation material to provide personnel working inside with comfort and decrease the energy expenditure of the internal air conditioning control systems, if present.

In another preferred embodiment, the walls of the movable cabinets for horizontal internal welding (300) are coated with an acoustic insulation material so as to provide personnel working inside with comfort.

Figure 18:
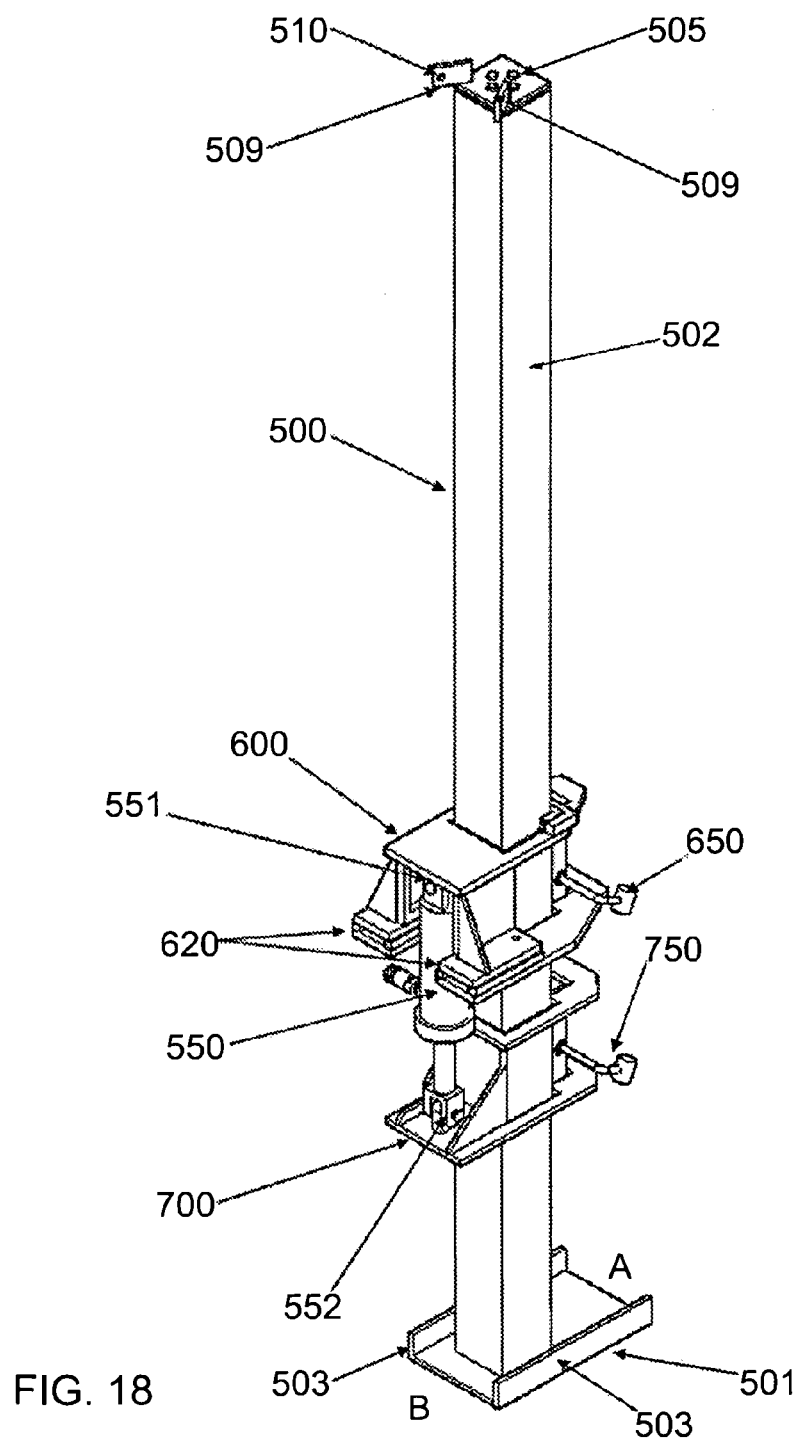
FIG. 18 shows a perspective front view of the collapsible device which allows carrying out one of the stages of the process of the present invention.
Figure 19:
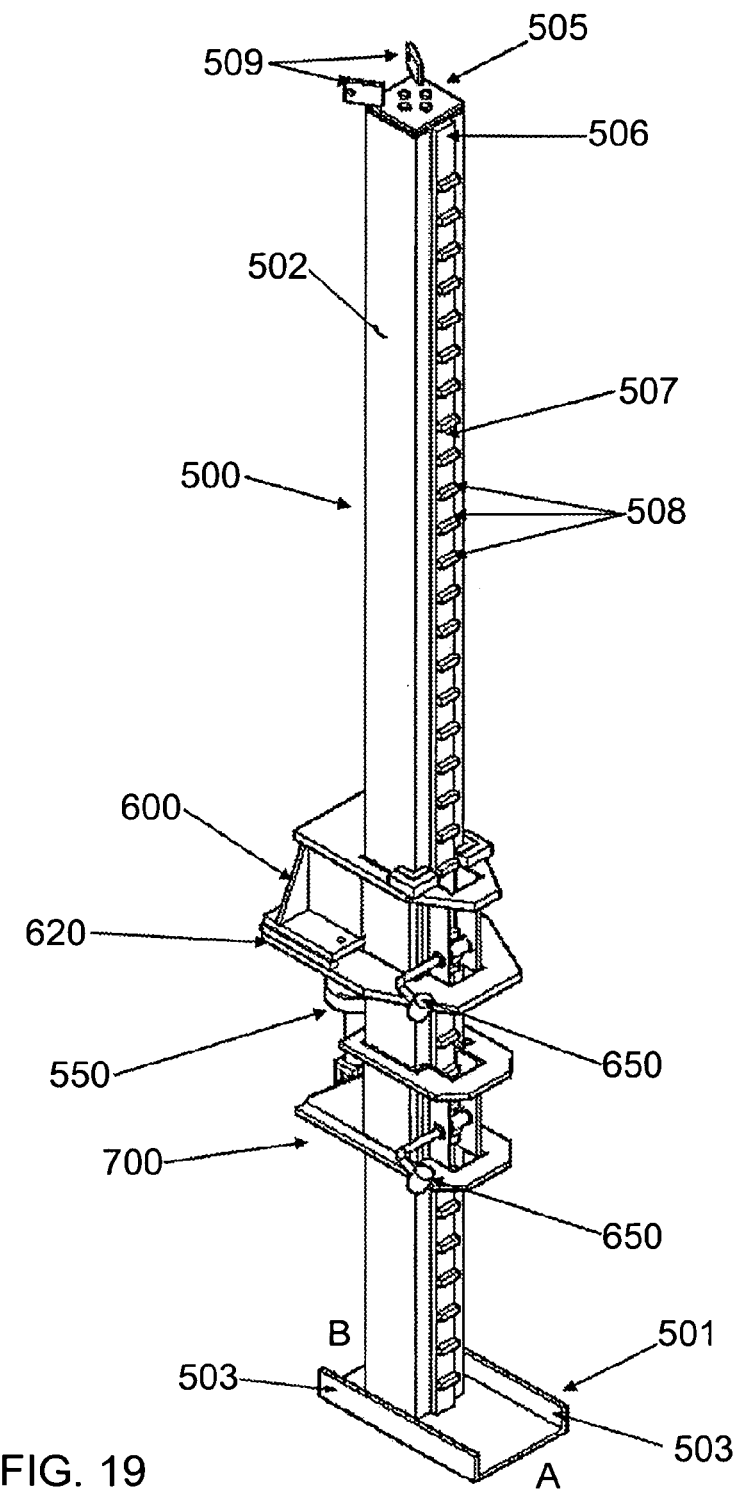
FIG. 19 shows a rear view of the collapsible device of FIG. 18.

In a preferred embodiment, said device for the traction of the sheet strip is an electric winch which drives a steel wire whose end is attached to a metal sheet welded to the end of the sheet to be moved. movable cabinets for horizontal internal welding (300) leave an empty space between their lower part and the tank floor (2) and between their front wheels (303) and (307) and rear wheels (304) which is wide enough to enable their transport on a collapsible device (500) as the one illustrated in FIGS. 18 and 19, set in horizontal and radial position on the tank floor (2).

After positioning the ring strip guide device (110) on the supporting bodies (101) of each supporting base devices (100), a device for the traction of the sheet strip is installed on a selected point of the periphery of the tank under construction.

In a preferred embodiment, said device for the traction of the sheet strip is an electric winch which drives a steel wire whose end is attached to a metal sheet welded to the end of the sheet to be moved. Said steel wire is set as a spiral surrounding the periphery of the tank under construction, passing through pulley wheels (113) of the guiding devices for the internal and external ring strip guide devices (110) and reaches the sheet forming device for the ring strips (400).

Once all the devices previously mentioned are placed, leveled and aligned, the strip of metal sheet is assembled for the first ring.

To do so, the first flat metal sheet is placed by means of an appropriate lifting device on the external end of the sheet forming device for the ring strips so that its lower end rests on said horizontal rolls (405) and it is held by said vertical rolls (404). This first sheet is moved manually or power-assisted on said rolls until its rear end is placed in a position to be welded between said vertical presses (407) in one of said fixed cabinets for vertical welding and alignment of sheets (402).

By means of a lifting device a second flat metal sheet is placed on the external end of the sheet forming device for the ring strips, vertically, so that its lower end rests on said horizontal rolls (405) and it is held by said vertical rolls (404). This second sheet is moved manually or power-assisted, on said rolls until its front end is placed in a position to be welded between said vertical presses (407) in one of said fixed cabinets for vertical welding and alignment of sheets (402).

In a preferred embodiment, said hoisting device is a movable crane.

Inside said fixed cabinet for vertical welding and alignment of sheets (402) the rear end of the first sheet and the front end of the second sheet are held by said vertical double press system (407) and aligned at an optimal distance to perform the welding between them. The welded seam of both sheets to achieve their concatenation is performed by means of at least one welding robot sliding on said calibrated vertical rails (408). The system also allows the use of manual welding.

The combination of vertical presses (407) which eliminate buckling, welding robots, systems of control and position regulation of parts added to the shelter and comfort granted by the fixed cabinets for vertical welding and alignment of sheets (402) guarantee welding of a high quality and short execution period, and allows continuous work even under adverse weather conditions.

Alternatively, welding control checks can be performed inside said fixed cabinets for vertical welding and alignment of sheets (402).

The welded sheets are then carried by means of said rolls until the rear end of the set is left in a position to be welded between said vertical presses (407) in one of said fixed cabinets for vertical welding and alignment of sheets (402).

On the front end of the first sheet of the set, a metal plate to which it is attached the end of the steel wire driven by said device for the traction of the sheet strip is welded, which enables the movement of the set of sheets linked together on said horizontal rolls (405) and between said vertical rolls (404).

The process of placing successive sheets on the external end of the sheet forming device for the ring strips (400), positioning the vertical edges to be welded between said vertical presses (407) in one of said fixed cabinets for vertical welding and alignment (402) and welding them, is repeated until forming a strip of a concatenation of sheets of the same or greater length than the perimeter of the tank under construction.

The number of simultaneous welded seams which can be performed with this process is equal to the number of fixed cabinets for vertical welding and alignment of sheets (400) that owns the sheet forming device for the ring strips (400), proportionally decreasing the time required to build a ring. The number of fixed cabinets for vertical welding and alignment of sheets (400) which the sheet forming device for ring strips (400) has is only limited by the available space on the construction site, which results in another novel advantage of this process.

In a preferred embodiment, a sheet forming device for the ring strips (400) is used, with at least two fixed cabinets for vertical welding and alignment of sheets (402), which allows performing two vertical welds simultaneously.

This novel process thus enables speeding up the circulation of raw material, since unloading sheets is performed at one point only, on the external end of the sheet forming device for the ring strips (400), which is the most distant place of the structure of the tank under construction. This enables optimizing the flow of transport bringing raw material to the construction site, at the same time that minimizes carrying heavy machinery in the area, since the lifting device used to place the sheets in the sheet forming device for ring strips (400) does not require movement all about the construction site, thus increasing personal safety for the personnel and decreasing insurance premiums as an indirect consequence.

The absence of heavy machinery circulating around the tank under construction also allows a substantial saving as to time and costs when avoiding the need for ground preparation on the periphery of the tank to bear the weight of said machinery, at the same time that enables a greater density of constructions due to the savings in space implied.

Unlike other processes known, this novel process enables the use of flat sheets of any thickness and size to build the ring strips, that in addition to granting a great versatility regarding construction requirements, maximize the efficiency of transport, for the flat sheets take up less space than pre-formed sheets.

As the strip of concatenated sheets is generated in said sheet forming device for the ring strips (400), it is carried on said horizontal rolls (405) guided by said vertical rolls (404) pulled by means of said wire driven by said device for the traction of the sheet strip and enters said external circle, which forms the external periphery of the structure of the tank under construction, on said horizontal rolls (111) of said ring strip guide devices (110) located on the external end on the supporting body (101) of each supporting base device (100). As the strip of sheets joined together generated in said sheet forming device for ring strips (400) enters said external circle, it acquires a bent shape thanks to the action of said vertical rolls (112) of said external supporting base devices (100).

When the strip of sheets joined together generated in said sheet forming device for ring strips (400) reaches a length equivalent to the perimeter of a ring, by means of said device for the traction of the sheet strip, the whole of it is carried until it is placed on the internal circle, on the periphery of the structure of the tank under construction. During the process of transport and positioning, said strip acquires the final diameter of the ring thanks to the action of said vertical rolls (112) of said ring strip guide devices (110) located on the internal end of said supporting base devices (100).

Once the first ring (3) is placed on its final position on said first internal circle, the metal plate to which the end of the steel wire driven by the device for the traction of the sheet strip is removed and the last vertical welded seam is performed.

In a preferred embodiment, said last vertical welded seam is performed automatically by means of a welding robot which slides on calibrated rails installed inside said movable cabinet for external horizontal welding (200).

In another preferred embodiment, said last vertical welded seam is performed automatically by means of a welding robot which slides on calibrated rails installed inside said movable cabinet for internal horizontal welding (300).

In another preferred embodiment, said last vertical welded seam is performed automatically, simultaneously by means of corresponding welding robots which slide on calibrated rails installed inside said movable cabinet for external horizontal welding (200) and said movable cabinet for internal horizontal welding (300).

The use of movable cabinets for internal (300) and external (200) welding to perform the last seam of vertical welding of the ring is another novelty of the present invention, which avoids the previous operations of alignment and fixation of systems of guides for the welding robots on the surface of the ring and the subsequent operations necessary to remove them, maintaining the quality of welding and guaranteeing continuous work even under unfavorable weather conditions.

However, the present invention also foresees that said last seam of vertical welding is performed manually or semi-automatically, by welding vertical rails temporarily on the ring to allow the movement of a welding robot.

At the same time the last vertical seam on the first ring (3) is performed in said sheet forming device for ring strips (400), the process of joining together sheets already described is started to generate the strip of sheet which shall form the second ring (4).

The metal plate to which the end of the steel wire driven by the device for the traction of the sheet strip is welded to the end of the first sheet of the sheet strip which shall form the second ring, and said wire is re-positioned on the vertical pulley-wheels (113) of the ring strip guide devices (110) of the supporting base devices (100).

The structure of the tank roof (1) is then built.

Once the first ring (3) is welded to the peripheral structure of the roof (1), it is finished including handrails, piping and fittings and the stretches of internal columns of the same height as the ring placed, if said columns were necessary; only some sheets for the roof are left without being placed to alleviate the pressure exerted by the wind and for the evacuation of personnel and tools in case of need at the last construction stage. The flight of stairs and the necessary fittings are also assembled on the ring, thus avoiding work in heights.

Then, a multiplicity of collapsible devices (500) are placed, with removable fittings (900A) to hoist structures. Said devices are placed in two positions: on the periphery of the tank on the internal side, and inside the tank adjacent to all the internal columns of the tank, in case said columns are present as the support of the structure, except for the central mast which was previously completely assembled. The number and distribution of the collapsible devices with detachable appendices to hoist the structures shall depend on the final weight of the tank structure.

Preferably, a collapsible device is placed with detachable appendices per each 5,000 kg of weight of the finished tank, without considering the weight of the bottom of the tank, since this shall not be borne by said devices.

A preferred embodiment of said collapsible device (500) already mentioned is illustrated in FIGS. 18 and 19, which allows coupling accessory supports to hold different parts of a tank under construction and comprises a pivot base (501), surface where the jack column rests (502) and which is constituted by a rectangular metal sheet folded at 90° at both larger sides as a tray in the shape of an inverted "U". These folds (503) at 90° provide the structure with rigidity and allows the passage of a pivot. Near one of the ends of the larger sides (rear end A) of said base (501) a perforation is drilled (504) (illustrated in FIG. 23) on both folds (503) of the sheet where the pivot is to pass through, so that said pivot is parallel to the smaller sides of the base (501), and that base (501) is able to spin on a center near one of the larger sides. Column (502) of the collapsible device is not welded centered on the base (501), but near one of the smaller sides on the opposite ends of the pivots (front end B), centered regarding the smaller side.

Figure 23:
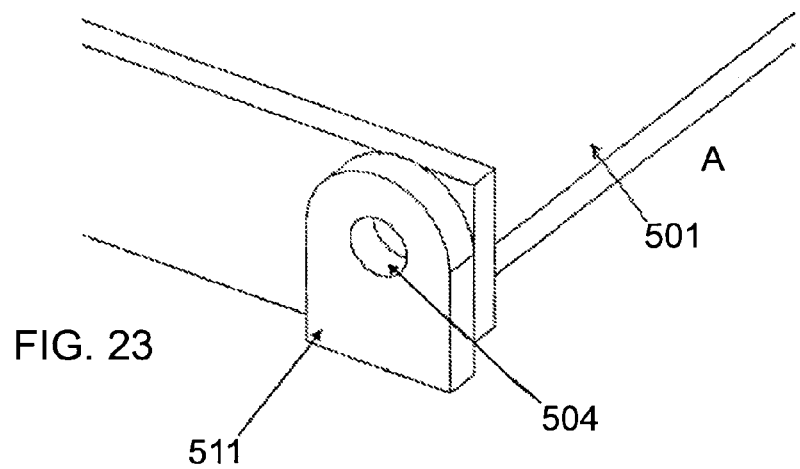
FIG. 23 is the detail of a wing applied to the base as to allow for the spinning of the column of the collapsible device of the present invention illustrated in FIG. 18.

FIG. 23 shows wings (511) which allow the column (502) to spin. Both wings (511), set on both sides of the base (501) comprise a perforated iron plate which enables the passage of the shaft through the perforation (504), linking them with the pivot base (501). Both wings (511) are welded or fixed to the floor, one at each side of the pivoting base (501) and allow the collapsible device to spin.

Figure 20:
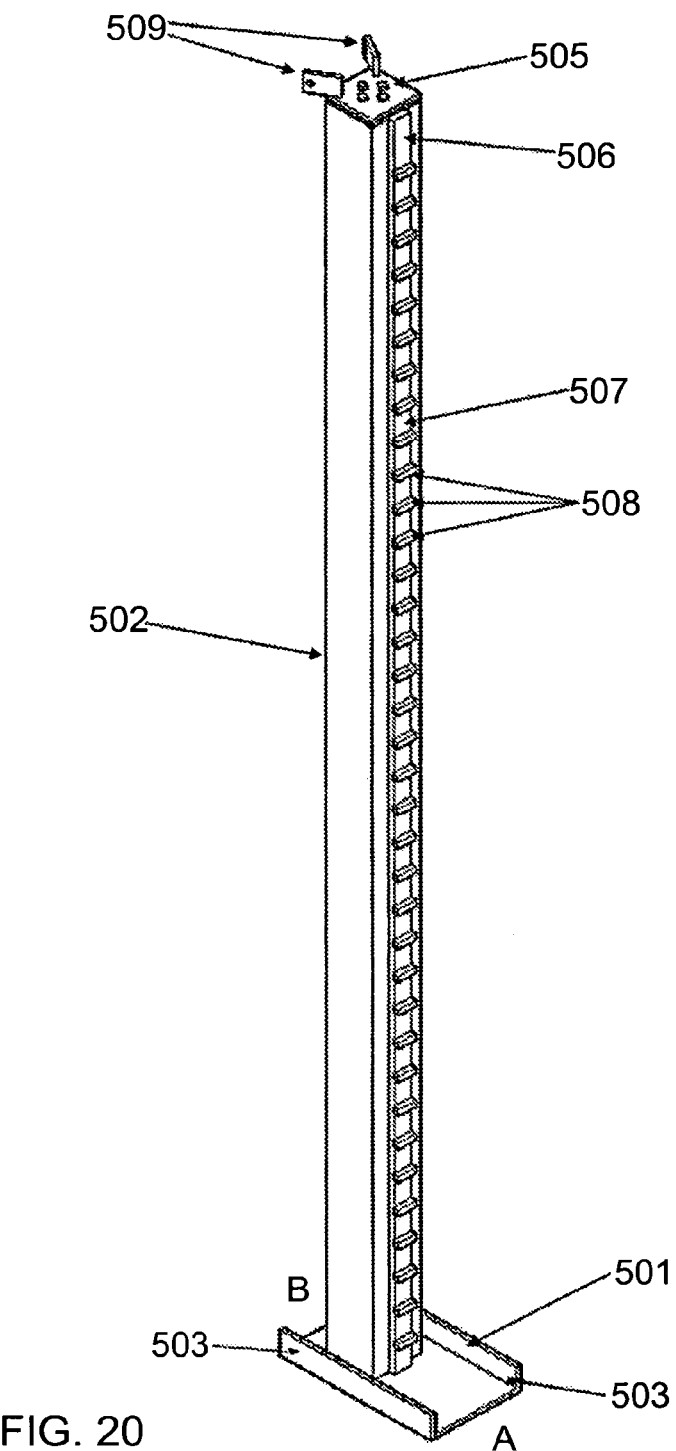
FIG. 20 shows a perspective view of the upright of the hydraulic collapsible device in FIG. 18.

The column (502) mentioned is preferably a hollow metal column of a square section made of steel sheet. Its lower end is welded to the base (501) and the upper end is covered with a sheet (FIGS. 18, 19 and 20 show its lateral edges) welded to the column (502). Holes are drilled on this sheet to allow bolting the end-of run device (505). The side near the pivots (rear side A) rack (506) is welded to the rack (506), being centered on the side regarding the vertical axis of column (502). Said rack (506) comprises a metal plate (507) of an equal length of column (502) being on one of the sides of the plate welded at interval regulars from the teeth (508) of the rack, consisting in metal bars of a square section, perpendicularly to the larger sides of the plate (507). The opposite side of the plate (507) is welded to the rear side of the column (502).

The end-of-run device or body (505) comprises a square metal part of a side slightly larger than the side of the square section of column (502). On the ends of its front side the tensor supports (509) are welded at 120° regarding the side, one on each corner. El end-of-run device (505) is bolted to the column cover (502), centered on it.

The tensor supporting parts (509) illustrated in FIGS. 18, 19 and 20 comprise a short steel plate with a perforation (510) near one of its ends so as to allow the attachment of tensors. Supports (509) are welded to the end-of-run device (505) at one of its larger sides so that they are set perpendicularly and protruding a distance approximately equal to half of its larger side.

Upper box (600) and lower box (700) are assembled inserted along column (502) by openings (601) and (701), and slide along said column. Said upper box (600) illustrated in FIGS. 24 and 25, as the lower box (700), has a safety box (650) on the rack side (506) of the column (rear side). A hydraulic piston (550) is attached (to) the upper box (600) by a shaft (551) that allows one degree of freedom to spin regarding the perpendicular axis of column (502), and which is located on the internal side, on the opposite side of the safety locking system (650). Together with the hydraulic piston (550) it is also found a fitting support system (620). The upper box (600) has means to minimize when sliding along column (502), comprising parts (602), fitting into corner parts which are "L" shaped (603). In a preferred embodiment, the upper box (600) is made of folded and welded steel sheets, and the means to minimize friction (602) are rectangular Teflon pads, arranged at right angles in square on metal plates folded in square (603), and are set on the corner where the upper box (600) rubs against the column (502), two on the upper rear corners and two on the lower front corners.

Figure 26:
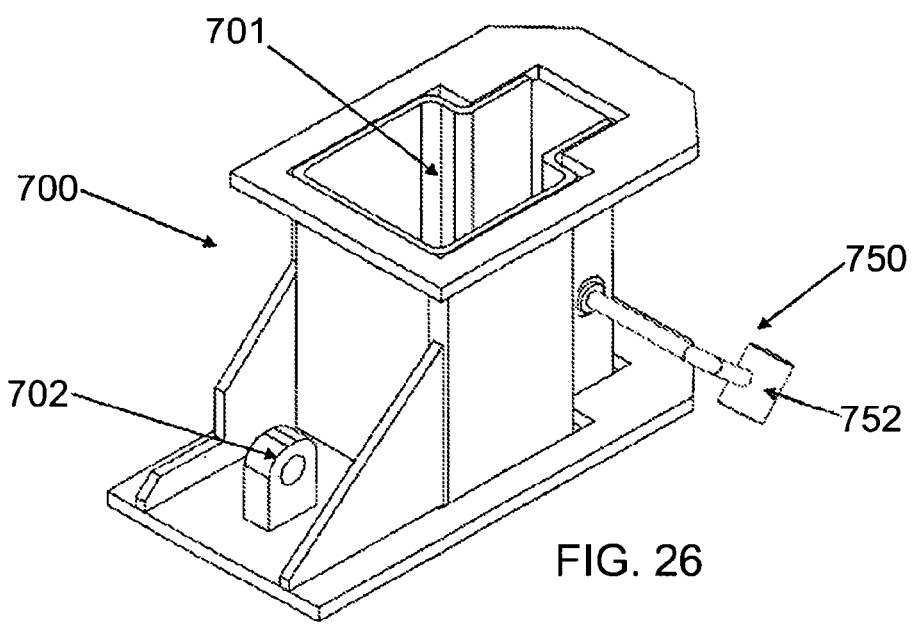
FIG. 26 shows a perspective front view of the lower box of the collapsible device in FIGS. 18 and 19.
Figure 27:
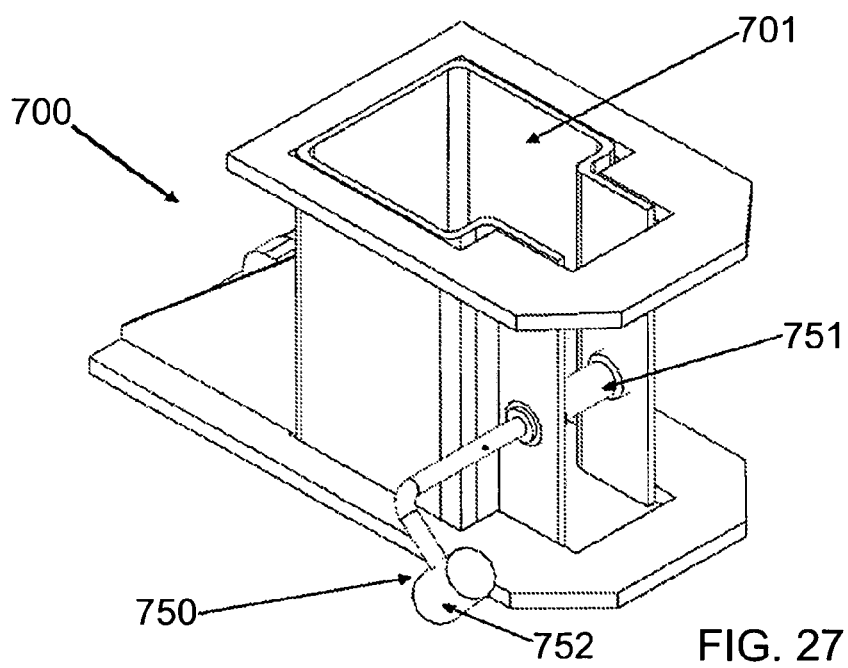
FIG. 27 shows a perspective rear view of the lower box of the collapsible device in FIGS. 18 and 19.
Figure 28:
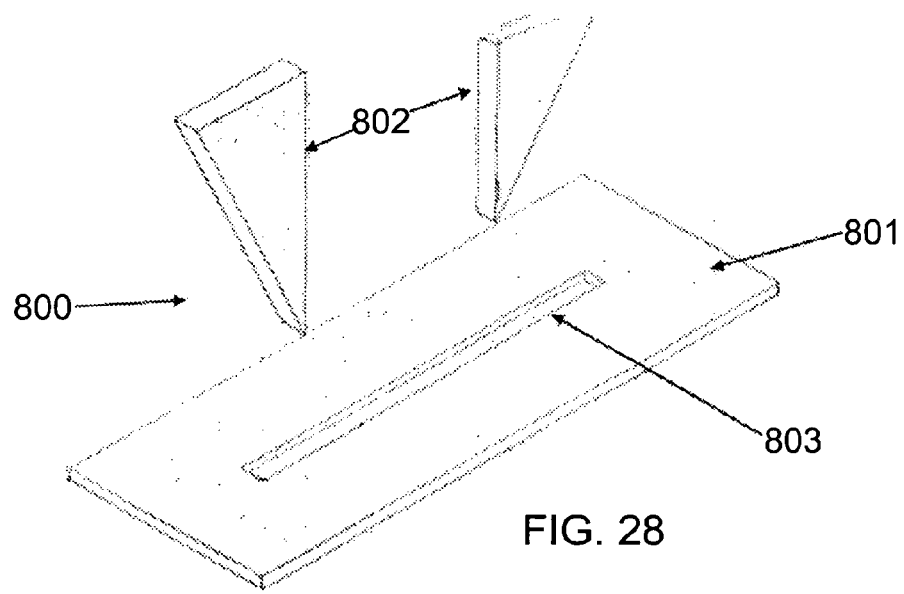
FIG. 28 shows the spacer for ring strips, preferably used at the alignment stage of the process of the present invention.
Figure 29:
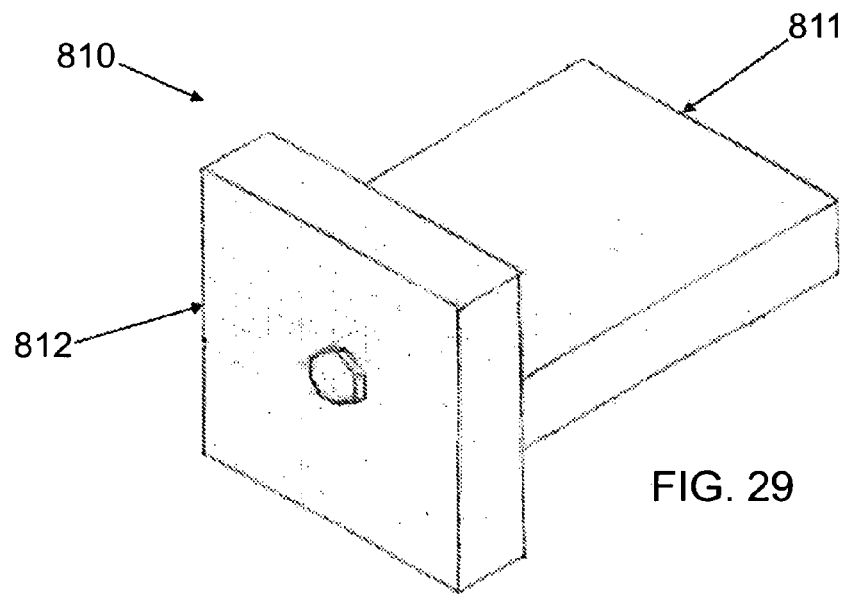
FIG. 29 is a view of an auxiliary device for the removal of removable appendices, applicable in the process of the present invention.

The lower box (700) illustrated in FIGS. 26 and 27, as well as the upper box (600), has a safety box (750) on the rack side (506) of the column (rear side), and a support for the hydraulic piston (550) on the opposite side. The hydraulic piston (550) is attached to the lower box (700) by a shaft (552) which enables it to spin freely perpendicularly to the column axis (502). The lower box (700) is preferably made of folded and welded steel sheet.

Figure 21:
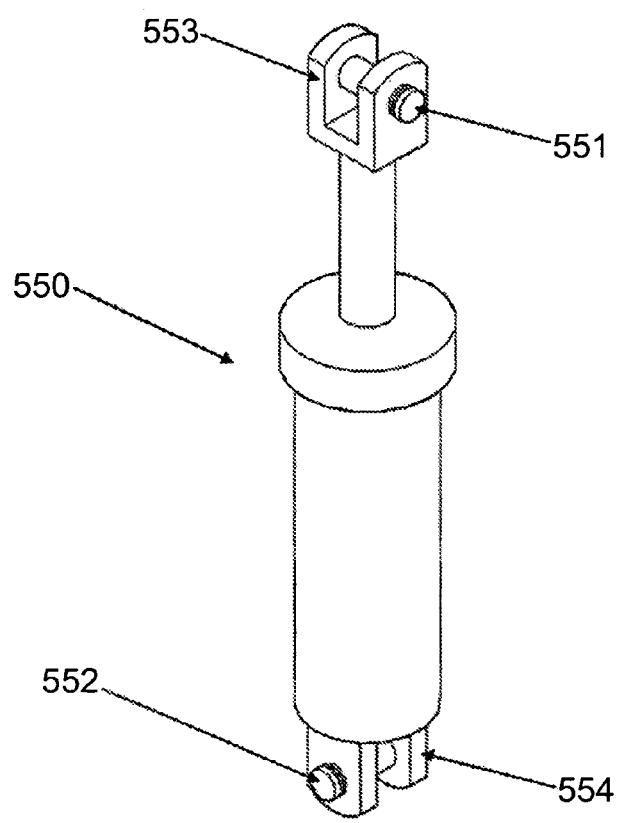
FIG. 21 is a perspective view of an extensible means preferably a hydraulic piston used in the collapsible device in FIG. 18.

The hydraulic piston already mentioned (550) which is shown individually in FIG. 21 is preferably a standard hydraulic piston linking the upper box (600) with the lower box (700) by its ends (553) and (554) joint respectively to bodies (604) and (702) so as to allow two degrees of freedom which compensates small variations in the verticality of both upper (600) and lower (700) boxes.

Regarding the safety locks of the upper (600) and lower (700) boxes are preferably standard gravity operated trigger locks (651) and (751) respectively, with counterweights (652) and (752) respectively, which enable the free vertical movement upwards of the boxes but prevents them from moving downwards.

Figure 22:
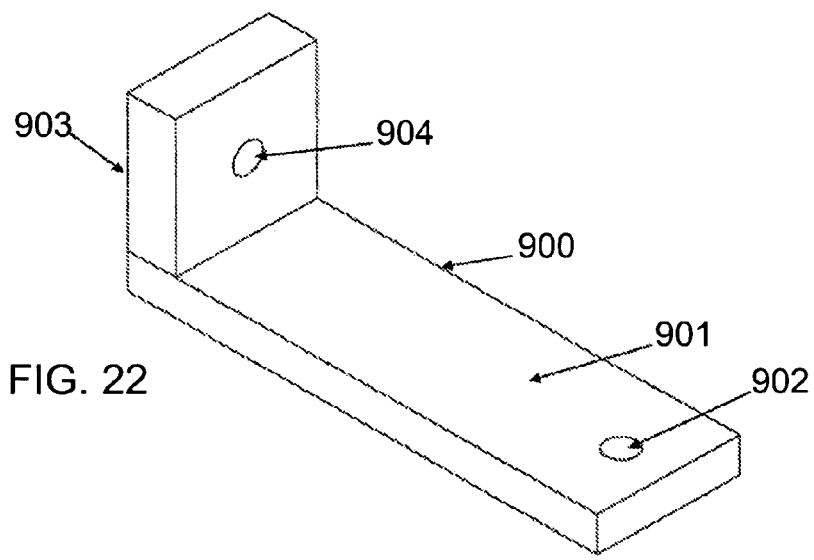
FIG. 22 shows a perspective view of the removable pawl-support of the hydraulic collapsible device in FIG. 18.
Figure 24:
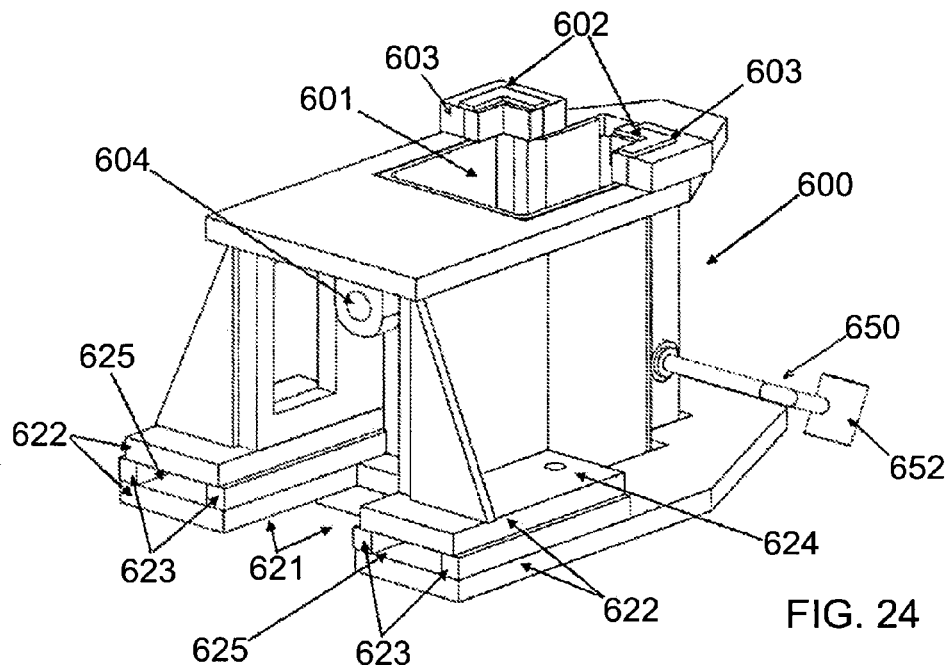
FIG. 24 shows a perspective front view of the upper box of the collapsible device in FIGS. 18 and 19.
Figure 25:
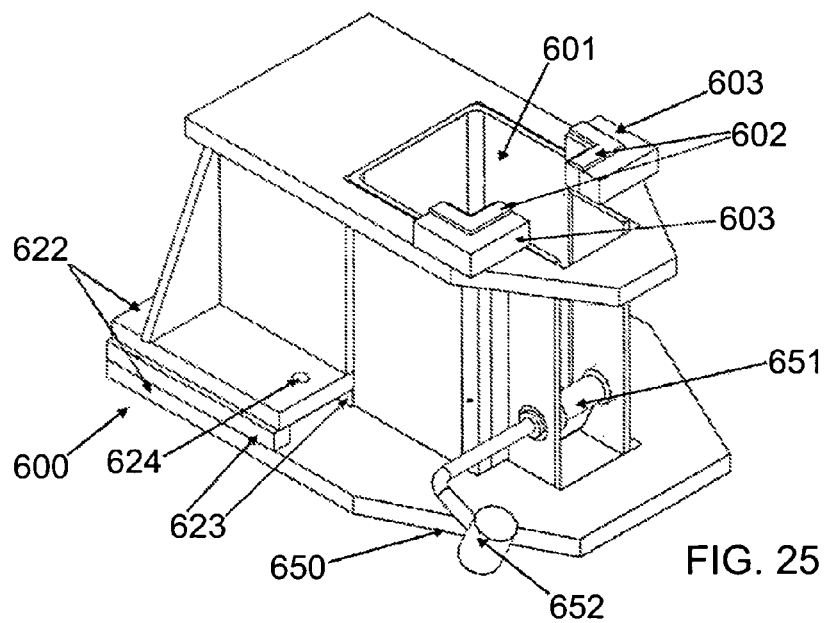
FIG. 25 shows a perspective view of the upper box of the collapsible device in FIGS. 18 and 19.
Figure 30:
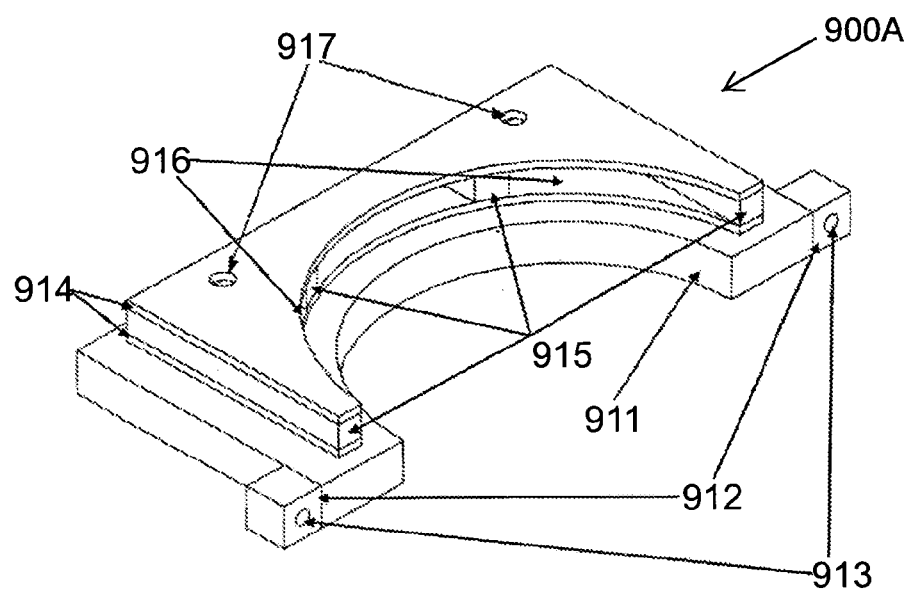
FIG. 30 shows a perspective lower view of one of the symmetrical parts constituting the removable supporting bracket of the collapsible device of the present invention.

FIGS. 24 and 25 show the upper box (600), in which it is defined the system of fitting support (620), comprising two sets of supports (621), each constituted by two horizontal sheets (622) separated by two metal bars of a square section (623), so as to allow for space (625) between both sheets, that as a "box frame" enables the insertion of a removable fitting (900, 900A) like those illustrated in FIGS. 22 and 30. The whole set (622-623) is firmly welded to itself and to the upper box (600) on its front part. Each support (622) has a through-hole (624) near one of its ends, by which a bolt (not illustrated) is introduced to hold the removable fitting inserted in each box frame "625".

The design of said removable fitting (900) depends on the object to be held for hoisting, but all of them have the common feature of having one or two protruding plates (901), preferably metal plates, of the same dimensions of the space (625) within the fitting support system (620), with a through-hole (902) that, on coinciding with the perforation (624) of the fitting support system (620), enables it to be locked by a bolt or similar system. These plates must be placed in the removable fitting (900) in the position necessary for their appropriate setting of the removable fitting (900) in the fitting support system (620).

In a preferred embodiment, the removable fitting (900) is a pair of metal "pawls" designed to hold a metal sheet by its lower edge, as shown schematically in FIG. 22, each one comprising a horizontal plate (901) with a perforation 902 near its end, which is to be inserted in one of the "box frames" (625) of the fitting support system (620). On the opposite end, another plate (903) set vertically at 90° has a threaded hole (904) through which an adjusting screw is introduced.

In another preferred embodiment, the removable fitting (900) is a metal device designed to hold vertical cylindrical parts ending in a bracket, as for example sections of a column, with two protruding horizontal plates perforated near their end, which are inserted in the "box frame" (625) of the fitting support system (620).

In another preferred embodiment, the removable fitting (900A) is a device of the "bracket" type, designed to hold a pipe or vertical, cylinder, with two protruding horizontal plates perforated near their end, which are inserted in the "box frame" (625) of the fitting support system (620). FIG. 30 shows a preferred embodiment of this type of accessory, comprising two equal and opposite pieces as sketched in FIG. 30, each of which comprises a rectangular metal sheet of a considerable thickness (911) with a semicircular perforation in the middle of one of its larger sides of an equal diameter as the external diameter of the vertical pipe to be held and corresponding supports (912) welded on its smaller sides, each with a perforation (913) which allows the passage of a bolt (not shown) to join said equal and opposite parts. On the lower side of each metal sheet of considerable thickness (911) a device formed by two equal rectangular metal sheets (914), smaller than the metal sheet of considerable thickness (911), each with a semicircular perforation in the middle of one of its larger sides, separated by four metal bars of a square section (915), so that to form t "box frames" (916) of an equal geometry to those "box frames" (625) of the fitting support system (620), being the set firmly welded to itself. Two through-perforations (917) in each part enable to secure—by means or bolts or other similar system—corresponding horizontal plates with a perforation near each of its ends, which are to be inserted in the "box frames" (625) of the fitting support system (620) and in the "box frames" (916) of the "bracket-type" device, thus linking the removable "bracket-type" fitting to the fitting support system (620) of one or two of the collapsible devices (500) of the present invention facing one another, according to the needs of the weight to be lifted. Varying the geometry of the metal sheets of considerable thickness (911) it is possible to adapt this removable fitting to hold the different types of objects to be hoisted.

The collapsible devices (500) of the present invention are placed in the selected place so that their front sides face the object, ring or column to be hoisted, at an appropriate distance for the implementation of the collapsible device (500) used to hold said object to be hoisted.

The collapsible device (500) is firmly anchored to the floor, fixing to this effect the wings (511) for the spinning of the column (502) and the tensor (not illustrated) on the one hand to the floor and on the other hand to the tensor support system (509) set on the end-of-run device (505) of column (502).

In a preferred embodiment the collapsible devices are assembled on the metal floor of the tank, and the attachment of the wings (511) as well as of the ends of the tensors to the floor is performed by welding.

The hydraulic system driving each hydraulic piston (550) is then connected. In a preferred embodiment, the hydraulic system is driven by a central unit which governs and coordinates a multiplicity of similar collapsible devices which work together to hoist the structure.

The upper (600) and lower (700) boxes are driven by a hydraulic cylinder (550) so that they are in their nearest position between them, and at the suitable height to set the removable fittings (900) holding the object to be lifted.

The removable fitting (900) are placed inside the cavities (625) of the fitting support system (620) and they are locked by a bolt.

In a preferred embodiment, the fitting support systems (620) of each collapsible device (500) used are placed in their positions nearest to the floor, and the removable fittings (900) used in each collapsible device (500) set on the periphery of the tank under construction are a pair of "pawls" as those illustrated in FIG. 22 which hold the first ring (3) by its lower edge, whereas the removable fittings (900) used in each collapsible device (500) arranged inside the tank under construction are "bracket type" devices as that sketched in FIG. 30, of a specific geometry to hold by their lower ends the stretches of the internal column of the tank under construction.

It is verified that the safety lock trigger (750) of the lower box (700) is properly assembled to lock said box.

After verifying the proper installation and attachment of the collapsible devices (500) with peripheral and interior removable fittings (900) for hoisting structures, their simultaneous and coordinated operation is performed. The collapsible devices (500) with removable fittings (900) for hoisting structures raise the ring strips-roof structure to a height slightly above the height of a ring plus the height of the supporting base devices.

For this purpose, every hydraulic piston (550) is activated, which tends to separate both boxes, pushing the lower box (700) downwards and the upper box (600) upwards. Due to the safety lock (750), the lower drawer (700) remains still whereas the upper box (600) moves upwards together with the structure held by the removable fitting (900) attached to the fitting support system (620)

In a preferred embodiment, the multiplicity of peripheral and interior collapsible devices (500) with removable fittings (900) for the elevation of structures are activated altogether to extend pistons in a coordinated manner.

When the maximum extension point of the hydraulic piston (550) is reached, the proper location of the safety lock trigger (650) of the upper box (600) is verified to check it locks it, and the hydraulic piston (550) which tends to bring both boxes together is contracted by pushing the lower box (700) upwards and the upper box (600) downwards. Due to the safety lock (650) immobilizing the upper box (600), the lower box (700) is raised.

In a preferred embodiment, the multiplicity of peripheral and interior collapsible devices (500) with removable fittings (900) for the elevation of structures are activated altogether to contract the pistons in a coordinated manner.

The process of verifying the correct locks (750) of the lower boxes (700), activating coordinately the hydraulic pistons (550) to lift the upper boxes (600) and the structure supported by them using the lower boxes (700) as a supporting point, verifying the correct locks (650) of the upper boxes (600) and contracting coordinately the hydraulic pistons (550) to lift the lower boxes (700) is repeated the necessary number of times to lift the structure to the desired height or until the upper boxes (600) reach the end-of-run devices (505) set on the upper end of the uprights.

Another object of the present invention is an automatic verification system to check that the locks (750) of the lower boxes (700) and the locks (650) of the upper boxes (600) are located in the correct position. This system has an optical sensor per lock, a transmitter of the signal generated by said sensor, a receiver which receives the signal from each of the sensors located in every collapsible device (500), an information processing unit and a communication interface that can be visual or auditory (or both) which reports the situation of each lock to the operator. This allows safe operations and avoids the need to assign personnel to verify the position of each lock.

In the construction process of a large size metal tank of the present invention, the roof of tank (1) attached to the first ring (3) is hoisted by said devices, attached to the lower edge of said ring up to an appropriate height to allow the insertion of the second ring (4).

The strip of concatenated metal sheets generated in said sheet forming device for ring strips (400) to construct the second ring (4), which rests on said exterior circle is then pulled to its final position by of said device for pulling the strip of metal sheet, on said horizontal rolls (111) of said ring strip guide devices (110) located on said internal circle. During the process of transport and positioning, said strip acquires the final diameter of the ring thanks to the action of said vertical rolls (112) of said ring strip guide devices (110) located on the internal end of said supporting base devices (100).

Once the second ring (4) is placed in its final position on said ring strip guide devices (110) located at the internal end of each supporting base device (100), the metal plate to which the end of the steel wire driven by the device for pulling the strip of metal sheet is attached, is removed, and the last vertical welding seam is performed in the same manner as described before for the vertical welding seam of the first ring (3).

While the last vertical seam in the ring strip, which forms ring (4) is performed on said sheet forming device for ring strips (400), the process of sheet concatenation described before starts, to generate the strip of metal sheet that shall form the next ring, which shall be placed on said external circle, on said horizontal rolls (111) of said external ring strip guide devices (110) of each supporting base devices (100), forming an external and concentric ring on the structure of the tank under construction.

The metal plate to which the end of the steel wire driven by the device for the traction of the sheet strip is welded to the end of the first sheet of the sheet strip which shall form the second ring, and said wire is re-positioned on the vertical pulley-wheels (113) of the ring strip guide devices (110) of the supporting base devices (100).

Then, if necessary, the structure constituted by the first ring and the tank roof is lowered, actuating the collapsible devices (500) until the removable fittings (900) of the collapsible devices (500) are almost resting on the upper edge of the second ring (4). In this position, a variable number of ring spacer devices (800) is placed between rings (3, 4).

In a preferred embodiment, the ring spacer devices (800) have a horizontal metal plate (801) of the thickness desired for the welding between the upper ring and the ring under construction, and long enough to allow the passage of two wedge-shaped vertical metal plates (802) through a perforation as a slot (803) in its central part, so that when placing the horizontal metal plate (801) between both rings and after placing the vertical wedges (802), one at the external end and the other one at the internal end respect to the tank under construction, the correct alignment of both rings is ensured.

An auxiliary device for the removal of detachable appendices (810) is placed between the removable fittings (900) of the collapsible devices (500) supporting the structure by the lower edge of the ring and, if necessary, at intermediate points between two continuous collapsible devices (500), in such a way that it is placed between both rings.

In a preferred embodiment, the removable auxiliary appendix-removing devices (810) comprise a horizontal metal plate (811) of a thickness slightly greater than the thickness of the removable fittings (900) of the collapsible devices (500), and of a length slightly greater than the thickness of the ring forming sheet, to which another plate is bolted (812), vertically, as a stop.

Then, the structure constituted by the first ring (3) and the tank roof (1) is lowered by actuating the collapsible devices (500) until it rests on the removable auxiliary appendix-removing devices (810).

The removable fittings (900) of the peripheral collapsible devices (500) are then removed and set at a 90° angle so that they are in radial horizontal position against the floor (2) and separated from the wall under construction. To do so, the tensors holding the collapsible device (500) are unlinked by the tensor supports (509) and it is disassembled by making it spin on it pivot base (501).

The easiness provided by the design of the collapsible devices regarding the disassembly and removal of removable fittings (900), allows the free access of operators and tools to the structure under construction, as well as the circulation of movable cabinets for horizontal internal welding (300) along the internal circumference of the ring, preventing the collapsible device (500) from hindering operations.

The use of peripheral detachable appendices of the supporting "pawl" type in the collapsible devices for hoisting structures, which hold the ring by its lower edge, makes it unnecessary to weld extra supports like handles or locks to the ring to hoist the set, remarkably speeding works by avoiding previous welding operations and subsequent cutting and trimming.

The auxiliary devices to remove removable appendices (810) are disassembled by levers or other means, thus the structure falls in a controlled manner and is left resting on the ring spacers (800).

Then, a stretch to each internal column is added, in case said columns are used. To do so, the bracket-type holding device of one of the collapsible devices (500) is removed, the collapsible device (500) is disassembled and a column stretch of the same height of a ring is welded. Then the collapsible devise (500) is restored vertically, it is anchored and the bracket-type holding device is mounted again on it so that it holds the new stretch of column by its lower edge. The process is repeated sequentially with each internal column, which enables not only distributing the weight of the structure evenly during assembly avoiding localized tensions on the finished structure, and also facilitates the whole process since it is not necessary to manipulate columns of large dimensions nor leave an unfinished roof until the end of the assembly, forcing operations to work on it at great heights and generally under the effects of the wind.

The use of detachable appendices of the "bracket" type in the collapsible hoisting devices (500) for hoisting internal structures, which hold the column stretches by their lower edge, makes it unnecessary to weld extra supports like brackets or locks to the column to hoist the set, remarkably speeding works by avoiding previous welding operations and subsequent cutting and trimming.

At the same time that the extension operations for internal columns develop, if any, the movable cabinets for external (200) and internal (300) horizontal welding move simultaneously along the periphery of the tank welding the lower edge of the first ring (3) to the upper edge of the second ring (4), by using corresponding welding robots housed in said cabinets.

The width of the movable cabinets for external (200) and internal (300) horizontal welding (200) allow their free movement along the rails (109) between the second ring (4) of the structure of the tank under construction and the strip of metal sheets which is being formed to generate the next ring, located on the external ring strip guide devices (110) of the supporting base devices (100), forming an external ring concentric to the second ring (4) of the tank under construction.

In a preferred embodiment, at least one movable cabinet for external horizontal welding (200) and at least one movable cabinet for internal horizontal welding (300) are used.

The combined use of ring spacer devices (800), collapsible devices (500), movable cabinets for external (200) and internal (300) horizontal welding and supporting base devices (100) enables the circulation of said movable cabinets for horizontal welding with both their welding robots along the interior and exterior periphery of the ring, which constitutes another innovative characteristic, since in traditional construction processes the use of hydraulic jacks and auxiliary supporting structures impede the use of automatic welders in a continuous form along the periphery of the tank, and the case of use of removable or collapsible hydraulic jacks forces the welding of a ring-shaped rail to the wall of the tank under construction to allow the movement of the welding robot, operation that requires a high amount of time and labor due to the poor tolerance in the alignment during the collocation and the need to perform trimming and finish operations on the wall of the tank under construction after its removal. Thus, the present invention ensures a high quality welding with uniform characteristics without performing extra auxiliary operations, with a lower demand for qualified personnel, and a speed limited only by the technology of the welding used and by the number of movable cabinets for horizontal welding and welding robots employed.

The use of closed and air-conditioned movable cabinets for horizontal welding constitutes another innovative characteristic which not only increases the comfort of personnel but also protects the operator and the welding robot from harsh weather conditions, allowing continuous work under extreme weather conditions such as winds, snowfall or rains, at the same time it enhances safety from multiple occupational risks such as the accidental drop of tools or parts from heights.

The use of movable cabinets for horizontal welding which move freely along the periphery of the tank under construction, whose roofs can be used by operators as working platforms, constitutes another innovative characteristic which avoids the need to assemble and disassemble a system of peripheral scaffoldings, thus requiring less labor and downtime, reducing costs of transport of material and increasing the occupational safety of operators.

Once the second ring (4) is welded to the first ring (3), the necessary fittings are attached to the second ring and to the corresponding stretches of interior columns, such as stretches of ladders, piping, handrails, etc.

The vertical position of the peripheral and interior collapsible devices for hoisting the structure (500) is restored, the tensors holding the collapsible device (500) by means of the tensor supports (509) are restored, and the removable fittings (900) are attached so that they hold the tank under construction by the lower edge of the just assembled second ring (4) and by the lower edge of the stretches of the interior columns added in the last step, if any.

In a preferred embodiment, the movable cabinets for internal horizontal welding (300) have a width inferior to the space existing between two peripheral continuous collapsible devices for hoisting structures (500), so that such movable cabinets for internal horizontal welding (300) are located between two peripheral continuous collapsible devices for hoisting structures (500).

In another preferred embodiment, the movable cabinets for internal horizontal welding (300) are temporarily removed from their position on the interior periphery of the tank under construction to allow the restoration of the vertical position of the peripheral and interior collapsible devices for hoisting structures (500).

After verifying the proper installation and attachment of the collapsible devices (500) with peripheral and interior removable fittings (900) for hoisting structures, their simultaneous and coordinated operation is performed. The collapsible devices (500) with removable fittings (900) for hoisting structures raise the ring strips-roof structure to a height slightly above the height of a ring plus the height of the supporting base devices (100).

The process described hitherto is repeated as many times as necessary to obtain the desired tank height. Thus, the total of ring strips and stretches of interior columns are assembled one by one, together with the relevant fittings in every stretch, hoisting the set, attaching new stretches and raising the new set once again.

This innovative construction system ensures that the strip of metal sheet needed for the construction of a ring is generated simultaneously with the assembly of the preceding ring, in such a way that when the assembly of a ring is finished, the next ring is ready for assembly, allowing a flow of work, continuous and independent of weather conditions, and increasing considerably the speed of the process compared to the processes known in the current state of the art.

The entire work is performed at a maximum height equal to the height of a ring at all times, including the assembly work of ladders and other fittings, which is an innovation of this invention which ensures not only the high quality of the finish favored by comfortable working conditions for the personnel but also the personnel safety, due to the low height of work and the use of internal (300) and external (200) movable horizontal welding cabinets which substitute the traditional systems of peripheral scaffolding, the supporting base devices (100) which ensure an escape route throughout the whole periphery of the tank and the inter-wall transport devices (9) which offer a safe means of transport.

While the penultimate ring is attached to the structure of the tank under construction, and once the strip of concatenated metal sheets generated in the sheet forming device for ring strips (400) reaches the length required for the last ring (5) and is placed on the periphery of the structure of the tank under construction on the horizontal rolls (111) of the ring strip guide devices (110) located at the exterior ends of the supporting base devices (100), said sheet forming device for ring strips (400) is removed.

Once the last ring (5) and the corresponding stretches of the internal columns are assembled and welded, the structure is lifted to a height slightly above the height of the supporting base devices (100); and the rails (109), external movable horizontal welding cabinets (200), inter-wall transport devices (9) and supporting base devices (100) are removed. The structure is then lowered to the tank floor (2), and after the removal of the detachable appendices of the collapsible devices, the structure is allowed to rest on the tank floor (2).

The internal movable horizontal welding cabinets (300) are removed as well.

In a preferred embodiment, the structure is lifted to a height which is sufficient to allow the removal of the internal movable horizontal welding cabinets (300).

In another preferred embodiment, the last ring (5) has an opening which is big enough to allow the removal of the internal movable horizontal welding cabinets (300).

In another preferred embodiment, the roof (1) of the tank has an opening which is big enough to allow the removal of the internal movable horizontal welding cabinets (300).

Afterwards, the collapsible devices (500) are disassembled and removed. In the preferred embodiment, the wings (511) for the spinning of the column and the wings for anchoring the tensors welded to the floor are cut. With the collapsible device (500) described, the work after the disassembly of the jack is minimized, which is reduced to only cutting four small fittings on the floor (2) of the structure.

The process finishes by welding the last ring (5) and the internal columns to the tank floor (2), at the same time that the operations necessary to achieve a neat finish in the interior of the tank are performed, such as the trimming of the sectors where the anchoring points of the collapsible devices were welded to the tank floor (2). Finally, after evacuating the interior of the tank, the roof is finished, placing the sheets in the sectors which were left uncovered to allow the relief of wind pressure and eventually evacuate personnel and tools in the final instance of the construction, and the fittings assembly is finished in the last ring (5).

Thus, work at height is reduced to a minimum, since it is only necessary for finishing details on the roof which, on the other hand, is provided with handrails, ladders and other fittings, and also reduces to a minimum internal finish operations on the tank floor, which constitutes another innovative characteristic of the present invention.

The invention claimed is:

1. A process for building a tank by "from top to down assembly", wherein the tank is built by welding several rings to one another, wherein each ring comprises a plurality of metal sheets joined together, the tank building process comprising:
   placing supporting base devices in a circle which defines a periphery of a tank to be built, linking said supporting base devices by horizontal rails;
   forming a ring strip by welding said metal sheets in at least one fixed cabinet for vertical welding and alignment of said metal sheets;
   said welding of the metal sheets comprising a step in which said metal sheets are aligned vertically by at least two vertical presses;
   said welding of the metal sheets being performed by welding robots sliding along vertical calibrated rails on opposing sides of said vertical presses to form the ring strip;
   joining ends of the ring strip together to form a first ring; and
   raising the first ring up to an upper ring wherein the forming of another ring strip could be simultaneous performed with horizontal welding between the first ring and the upper ring;
   wherein each supporting base device comprises at least two ring strip guiding devices, one guiding device on an internal circle which defines a final size of the tank and the other guiding device on an external circle, wherein ring strips are received on the guiding devices on the external circle while the joining to form the first ring, the raising, and the horizontal welding are taking place on the guiding devices on the inner circle.

2. The process for building a tank according to claim 1, further comprising the following steps:
   a) preparing a base of the tank and building a tank floor;

b) placing stretchers for access and exit of personnel, tools and materials at selected points on the periphery of the tank to be built between said supporting base devices;

c) placing at least one ring strip forming device along with the at least one fixed cabinet for the vertical welding and alignment of the metal sheets tangentially to the periphery of the tank to be built;

d) moving said strip of metal sheets while being formed into said ring strip onto said supporting base devices on the external circle and then transporting said ring strip to the internal circle; wherein a total length of said strip of metal sheets is at least equal in length to a circumference of a desired ring;

e) the joining of the ends of the ring strip is performed on said supporting base devices by vertical welding a seam between the ends of the ring strip;

f) optionally, building a roof of the tank attached to an upper end of said upper ring and to first stretches of internal support columns of the tank to form a first set;

g) placing collapsible hoisting devices along the inner circle on an internal side of the tank and next to each of said first stretches of internal support columns of the tank, said first stretches of internal support columns being of a length equal to a height of said ring strip;

h) forming a following ring strip in said fixed cabin of vertical welding and alignment of metal sheets and placing said following rings strip externally on said supporting base devices on the external circle at the same time that the joining to form the first ring, the raising, and the horizontal welding are carried out;

i) lifting by said collapsible hoisting devices the first set and the first ring;

j) moving said following ring strip to a final position on the internal circle and performing a last vertical welding to finish shaping said following ring strip into a following ring;

k) lowering the set onto said following ring by said collapsible hoisting devices, and placing spacers between the set and the following ring;

l) welding a lower rim of the first ring with an upper rim of said following ring and welding new stretches of support columns to said first stretches of internal support columns;

m) repeating steps h to l as many times as necessary to obtain a desired height for the tank;

n) removing the supporting base devices from the periphery of the tank and said stretchers for the access and exit of personnel, tools, and materials;

o) using said collapsible hoisting devices, lowering the set of ring strips-roof-stretches of internal columns so that the collapsible hoisting devices rests on the tank floor;

p) removing said collapsible hoisting devices and welding a lower rim of a lowest ring and of bases of lowest stretches of the internal support with the tank floor; and q) performing minor operations to finish the tank.

3. The process for building a tank according to claim 2, wherein ring strips are formed by means of the ring strip forming device that comprises a double T base, legs of adjustable height, rollers to guide the metal sheets, and the at least one fixed cabinet for vertical welding and alignment of metal sheets;

wherein said base is of a greater length than a length of each metal sheet forming the ring strip; and said legs of adjustable height are placed in pairs on opposing sides of the base and comprise hydraulic, pneumatic, or mechanical pistons.

4. The process for building a tank according to claim 3, wherein said rollers to guide metal sheets of said ring strip forming device for rings are positioned on said double T base horizontally and perpendicularly to a main axis of the double T base and vertically to each side of the base, in pairs, separated by a distance greater than a width of the metal sheets forming the ring strip and at different heights to allow movement of the metal sheets placed vertically.

5. The process for building a tank according to claim 1, wherein said at least one fixed cabinet for vertical welding and alignment of metal sheets is a closed cabinet having enough room to accommodate at least one operator and at least one set of welding equipment and with openings on opposite sides of the closed cabinet so that the double T base and the metal sheets can extend through the openings, comprising:

a) the at least two vertical presses are selected from the group comprising hydraulic, pneumatic, or mechanical presses and placed in such a manner that each press presses one of the metal sheets to keep the metal sheets aligned at a distance in order to perform the vertical welding between the metal sheets;

b) the calibrated vertical rails located in such a manner that the calibrated vertical rails allow the movement of the welding robots along said calibrated vertical rails;

c) accessory systems selected from the group comprising internal air conditioning control, lighting control, welding quality control, sheet positioning control, remote control systems, monitoring systems, and welding robot control system; and d) optional coatings for the walls and roof selected from thermal and acoustic insulation.

6. The process for building a tank according to claim 2, wherein each of said supporting base devices further comprises a supporting body and at least one leveling element.

7. The process for building a tank according to claim 6, wherein said horizontal rails of said supporting base devices are welded on an upper part of said supporting base devices to allow for movement of movable horizontal welding cabinets upon the horizontal rails.

8. The process for building a tank according to claim 6, wherein said ring strip guiding devices of said supporting base devices comprising:

a) a reinforced sheet structure of the geometry to fit said base of said supporting base devices so as to use it as a runner having a horizontal flat upper side;

b) at least two horizontal rollers arranged on the horizontal flat upper side of said reinforced sheet structure, wherein the at least two horizontal rollers allow for sliding of ring strips;

c) at least three vertical rollers, removable and interchangeable, arranged on the horizontal flat upper side of said reinforced sheet structure, wherein the at least three vertical rollers allow for sliding and shaping of ring strips; and d) at least one removable and interchangeable pulley wheel, arranged on the horizontal flat upper side of said reinforced sheet structure, wherein the at least one removable and interchangeable pulley wheel allows for guiding wires to pull ring strips.

9. The process for building a tank according to claim 6, wherein the horizontal welding of the raised and upper rings is performed by external horizontal movable welding cabinets and internal horizontal welding movable cabinets, each external horizontal movable welding cabinet comprises:

a) a closed and air-conditioned cabinet having enough room to accommodate at least one operator and one welding equipment, at least one window to allow the welding equipment to approach the rings to be welded, and of a geometry allowing movement in a circular manner along the periphery of the tank between the internal circle and in the external circle;
b) a ladder and handrails to allow operators to work safely on a roof of the external horizontal movable welding cabinet;
c) at least three wheels for the movement along said horizontal rails;
d) at least one engine with at least one driving wheel and an engine control system for movement of the external movable welding cabinet;
e) accessory systems selected from the group comprising control of internal air conditioning, lighting control, welding quality control, remote control systems, and monitoring systems; and
f) optional coatings for the walls and the roof of the external horizontal movable welding cabinet, selected from thermal and acoustic insulation.

10. The process for building a tank according to claim 9, wherein said internal horizontal movable welding cabinets move along said horizontal rails, each internal horizontal movable welding cabinet comprises:
a) a closed and air-conditioned cabinet having enough room to accommodate at least one operator and one welding equipment, at least one window to allow the welding equipment to approach the rings to be welded, and of a geometry allowing movement in a circular manner along the internal circle;
b) at least one wheel for the movement along said horizontal rails and at least one wheel for movement on the tank floor;
c) at least one engine with at least one driving wheel and an engine control system for the movement of the internal horizontal welding cabinet;
d) accessory systems selected from the group comprising internal air conditioning control, lighting control, welding quality control, remote control systems, and monitoring systems; and
e) optional coatings for the walls and the roof of the internal horizontal movable welding cabinet, selected from thermal and acoustic insulation.

11. The process for building a tank according to claim 2, wherein prior to forming the ring strip a central mast is erected, wherein the central mast is used as a guide during the lifting and as a central column once construction of the tank is complete.

12. The process for building a tank according to claim 1, wherein the vertical welding of the metal sheets is performed outside the periphery of the tank, while the vertical welding of the seam between the ends of the ring strip are performed on the inner circle.

* * * * *